US012724538B2

(12) United States Patent
Bangalore Narasimhamurthy et al.

(10) Patent No.: US 12,724,538 B2
(45) Date of Patent: Sep. 1, 2026

(54) DETECTING MEMORY CAPACITY ANOMALIES IN SPARSE DATA ENVIRONMENTS

(71) Applicant: HEWLETT PACKARD ENTERPRISE DEVELOPMENT LP, Spring, TX (US)

(72) Inventors: Nuthan Prasad Bangalore Narasimhamurthy, San Jose, CA (US); Manoj Srivatsav, Bangalore (IN); Dhishankar Sengupta, Bangalore (IN); Mayukh Dutta, Bangalore (IN); Sivasakthi Thirugnanapandi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 19/171,685

(22) Filed: Apr. 7, 2025

(65) Prior Publication Data

US 2026/0161296 A1 Jun. 11, 2026

(30) Foreign Application Priority Data

Dec. 9, 2024 (IN) ............................ 202411097097

(51) Int. Cl.
*G06F 12/00* (2006.01)
*G06F 3/06* (2006.01)

(52) U.S. Cl.
CPC .......... *G06F 3/0614* (2013.01); *G06F 3/0653* (2013.01); *G06F 3/0673* (2013.01)

(58) Field of Classification Search
CPC ..... G06F 3/0614; G06F 3/0653; G06F 3/0673
USPC .......................................................... 711/154
See application file for complete search history.

(56) References Cited

U.S. PATENT DOCUMENTS 12,314,799 B2 * 5/2025 Burch, V ........... G06K 7/10297
2017/0060918 A1 * 3/2017 Iyer ....................... G06F 3/0685

OTHER PUBLICATIONS

Bauyrjan Jyenis, Sep. 26, 2020; Anomaly Detection in Time Series Sensor Data.*
Mendoza et al. Jun. 2018; Machine Learning for Anomaly Detection on VM and Host Performance Metrics.*
Abanda, A., et al.; A Review on Distance Based Time Series Classification; Data Mining and Knowledge Discovery; Mar. 2019; 33.2; 33 pgs.; retreived from https://bird.bcamath.org/bitstream/handle/20.500.11824/888/review.pdf;jsessionid=ADFC7E9AE4D9AA43F025FAFDDF0224.
Startree Developer Hub; Anomaly Detection Algorithms; retrieved online Jan. 13, 2025; 9 pgs; Concepts Anomaly Detection Algorithms; https://dev.startree.ai/docs/get-started-with-thirdeye/concepts-data-alerts-notifications/concepts-anomaly-detection-algorith.

* cited by examiner

*Primary Examiner* — Mardochee Chery
(74) *Attorney, Agent, or Firm* — Dickinson Wright

(57) ABSTRACT

Systems and methods are provided for predicting memory capacity issues at a user device by analyzing sparse and/or sporadic alert data generated by the user device. Using the time series dataset, the system can detect an anomaly based on the alert data. The system can initiate an action associated with the detected anomaly (e.g., regarding memory usage, adding memory, reclaiming memory using a local command, and other actions).

20 Claims, 15 Drawing Sheets

400

| Day 410 | Alerts 420 | Average Distance 430 | Variance 440 | Min Distance 450 | Max Distance 460 |
|---|---|---|---|---|---|
| 9/1/23 | [50%, 75%] | 1 | 0.5 | 0 | 1 |
| 9/10/23 | [90%, 90%, 75%] | 1.3 | 0.3 | 1 | 2 |
| 9/15/23 | [] | NaN | NaN | NaN | NaN |
| 10/1/23 | [50%, 75%, 90%] | 1 | 1 | 0 | 2 |

FIG. 4

COMPUTING COMPONENT 1100

HARDWARE PROCESSORS 1102

MACHINE-READABLE STORAGE MEDIA 1104

INSTRUCTIONS TO RECEIVE A MEMORY CAPACITY ALERT 1110

INSTRUCTIONS TO CONVERT A MEMORY CAPACITY ALERT VALUE TO A DISTANCE BETWEEN A PLURALITY OF MEMORY CAPACITY ALERT VALUES RECEIVED FROM THE USER DEVICE 1120

INSTRUCTIONS TO GENERATE A TIME SERIES DATASET FROM THE DISTANCE 1130

INSTRUCTIONS TO INITIATE A CLUSTERING PROCESS USING THE TIME SERIES DATASET 1140

INSTRUCTIONS TO DETERMINE AN ANOMALY BASED ON THE CLUSTERING PROCESS 1150

INSTRUCTIONS TO INITIATE AN ACTION ASSOCIATED WITH THE USER DEVICE THAT IDENTIFIES THE ANOMALY 1160

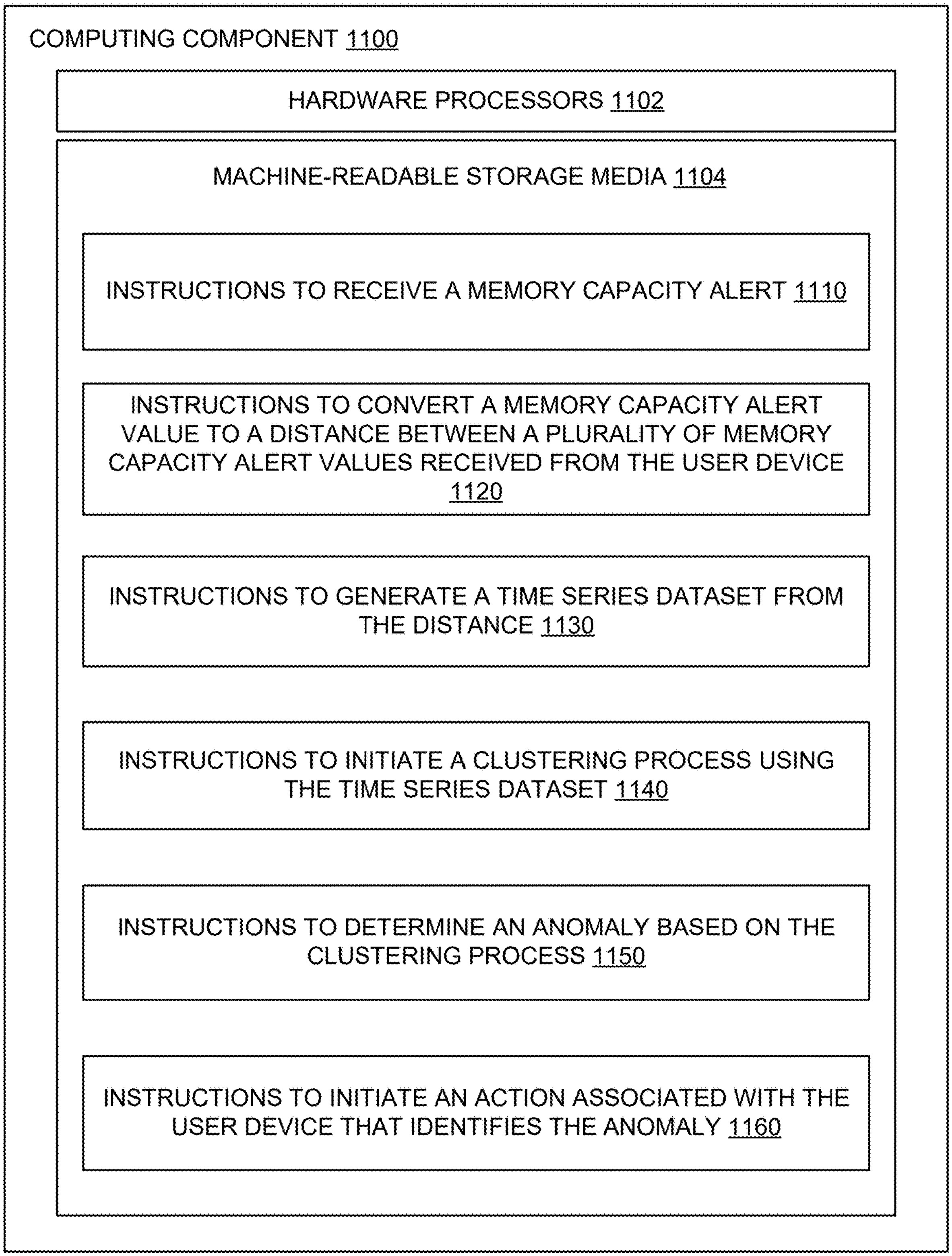

FIG. 11

COMPUTING COMPONENT 1300

HARDWARE PROCESSORS 1302

MACHINE-READABLE STORAGE MEDIA 1304

INSTRUCTIONS TO RECEIVE A FIRST MEMORY CAPACITY ALERT FROM A USER DEVICE 1310

INSTRUCTIONS TO CONVERT A MEMORY CAPACITY ALERT VALUE TO A DISTANCE BETWEEN A PLURALITY OF MEMORY CAPACITY ALERT VALUES RECEIVED FROM THE USER DEVICE 1320

INSTRUCTIONS TO GENERATE A PROFILE PLOTTING THE DISTANCE TO A PERIOD OF TIME 1330

INSTRUCTIONS TO GENERATE A TIME SERIES DATASET FROM THE PROFILE 1340

INSTRUCTIONS TO RECEIVE A SECOND MEMORY CAPACITY ALERT COMPRISING A SECOND MEMORY CAPACITY ALERT VALUE 1350

INSTRUCTIONS TO INITIATE AN ACTION ASSOCIATED WITH THE SECOND MEMORY CAPACITY ALERT 1360

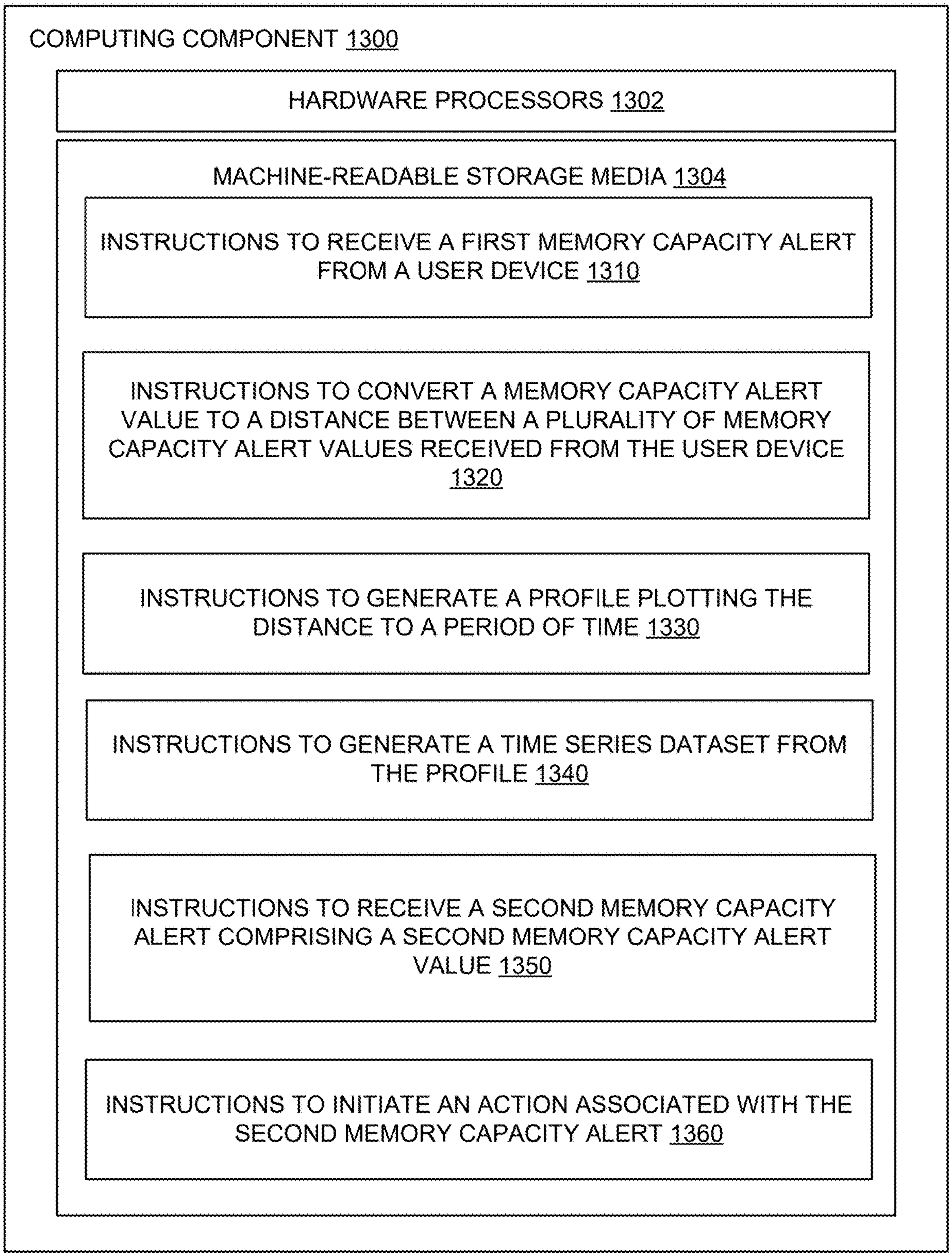

FIG. 13

DETECTING MEMORY CAPACITY ANOMALIES IN SPARSE DATA ENVIRONMENTS

CROSS REFERENCE TO RELATED APPLICATIONS

This application claims the benefit of and priority to India Provisional Patent Application No. 202411097097, filed on Dec. 9, 2024, the contents of which are incorporated herein by reference in their entirety.

BACKGROUND

Memory capacity and processing speeds of user devices are improving every day, and many of the operations of these user devices are tracked in real time. For example, the operating status of a memory or processor of a user device may generate a data point, and in aggregation, a set of multiple, time series data points form a time series dataset that can show the operational status of the user device over time. A monitoring device can analyze this data (the set of multiple time series data points) to detect a pattern of operations of the user device, and make determinations about the user device based on the detected pattern.

BRIEF DESCRIPTION OF THE DRAWINGS

The present disclosure, in accordance with one or more various examples, is described in detail with reference to the following figures. The figures are provided for purposes of illustration only and merely depict typical, non-limiting aspects of such examples.

FIG. 4 illustrates a profile comprising memory capacity alerts and distances between the memory capacity alerts, in accordance with examples discussed herein.

FIG. 11 is a computing component that may be used to implement examples of the disclosed technology.

FIG. 13 is a computing component that may be used to implement examples of the disclosed technology.

Figure 1:
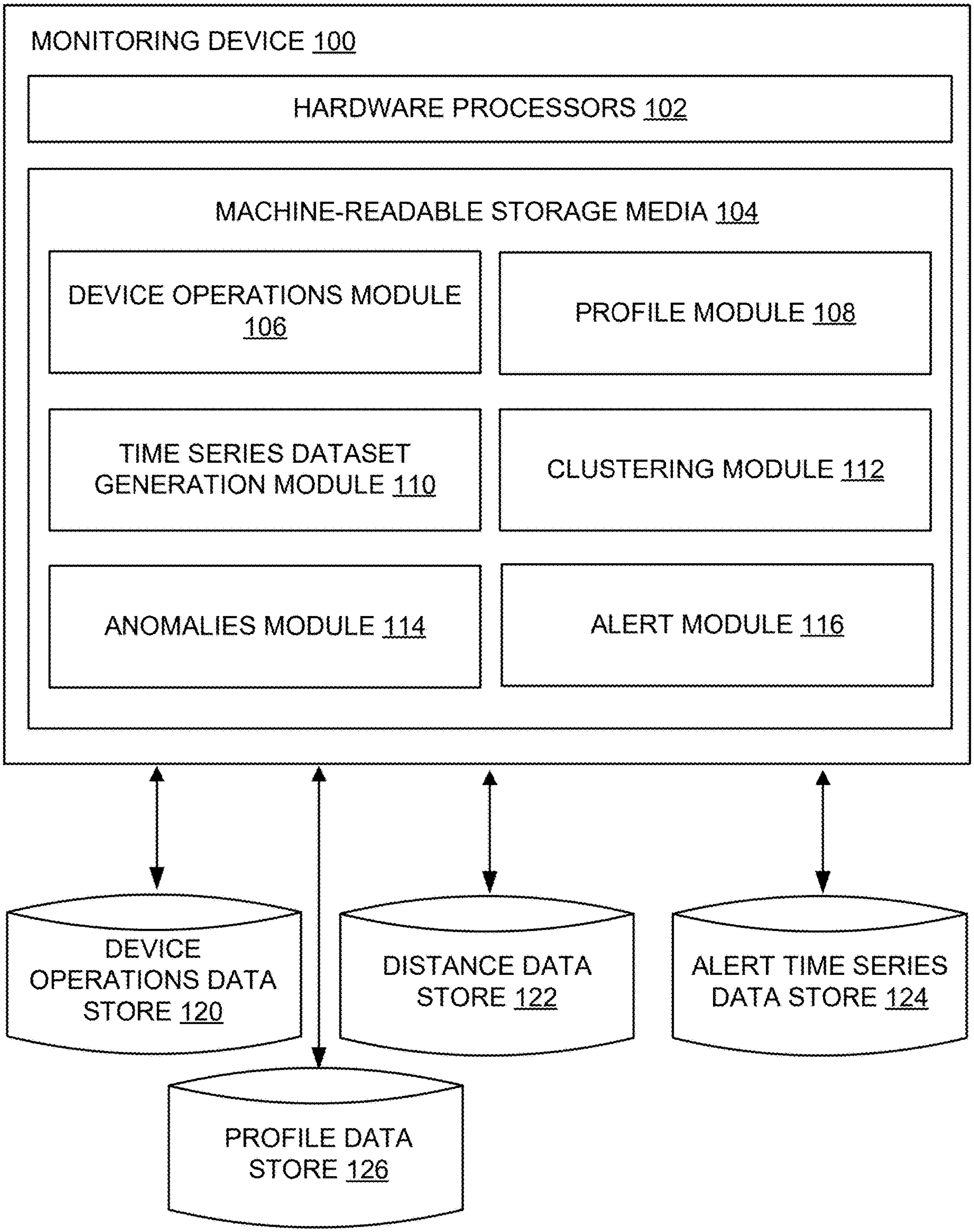
FIG. 1 is an illustrative monitoring device configured to detect memory capacity anomalies in sparse data environments, in accordance with examples discussed herein.

The figures are not exhaustive and do not limit the present disclosure to the precise form disclosed.

DETAILED DESCRIPTION

As noted above, a monitoring device can analyze a time series dataset. However, when the monitoring device is remote from the user device whose data is being monitored, or when the time series dataset is replaced with sparsely-generated data points, traditional data pattern detection algorithms may become unusable. For example, the user device may generate an alert when the memory capacity reaches a maximum threshold value. This alert is a data point that cannot translate to a time series dataset, because the data point is not continuously generated. In the context of alert-related data, unless the alert-triggering condition is a continuously-occurring condition, for example, the alert will only be generated at a single point in time. As such, the monitoring device does not have the ability to analyze multiple data points that make up a time series dataset to generate the pattern of operations that could have led to the generation of the alert. The availability of sparse data (e.g., the alert), rather than a voluminous time series dataset (e.g., all memory capacity fluctuations and processing operations of the user device), may render customary monitoring software unusable for the purpose of analyzing the sparse data that is available to the monitoring device.

Examples of the current technology describe a monitoring device that predicts memory capacity issues at the user device by analyzing sparse/sporadic alert data generated by the user device, absent access to the complete operational time series dataset of the device. Traditional monitoring approaches often falter in this context because they rely on a consistently-occurring/generated time series dataset to detect the memory capacity patterns (e.g., via data ingestion and reclaim operations) in view of the entire picture of operations of the device.

In some examples, the monitoring device can generate a daily usage alert profile (or "profile") of a user device that tracks the memory capacity alerts received from the user device. The profile may store various information associated with the memory of the user device. For example, the monitoring device may generate a "distance" (e.g., similarity determination) between the memory capacity alert value in the memory capacity alert and other memory capacity alert values in other alerts received from the user device. The distances may be stored in the profile. In other examples, a plurality of memory capacity alerts may be received from the user device in a day, a corresponding entry in the profile may be included for each alert. Various periods of time may be used to generate the profile without diverting from the essence of the disclosure (e.g., hourly profiles, weekly profiles, etc.).

The profile may be used to infer the memory capacity and other functionality of the user device, absent having access to the local memory. For example, the profile may be based on the memory capacity alert values received from the user device in the alerts. The monitoring device may use the profile to infer future memory capacity levels of the user device by comparing the profile to the latest alert with the previously generated profile for the memory. When the current profile exceeds a similarity threshold, the alert value may be identified as an anomaly.

The alert may be generated by a user device about its local memory. For example, a user device may monitor a local memory capacity/usage in accordance with a set of rules and, based on the monitoring, may determine the memory capacity alert value once it exceeds a memory threshold value. The rules at the user device may trigger the generation of the memory capacity alert that includes the memory capacity alert value, and transmission of the memory capacity alert to the monitoring device. The monitoring device may receive a memory capacity alert from the user device, which includes the memory capacity alert value in the alert, and use it to create a profile of the memory capacity/usage of the memory at the user device, without a full view into the operations of the user device.

In some examples, the monitoring device may convert the memory capacity alert values to a different scale than a linear scale using a distance matrix. For example, the monitoring device may compare two memory capacity values in two memory capacity alerts and convert the difference between the memory capacity values to a first value/distance in accordance with a distance matrix. The use of the distance defined in the distance matrix can help quantify the similarity between the memory capacity alert values. For example, 50% memory capacity to 75% memory capacity may be defined as having a similar importance as the difference between a 75% memory capacity to a 90% memory capacity. Based on the defined similarity, the distance matrix can define the distances between these memory capacity alert values as being the same distance, irrespective of the non-linear nature of the actual values (e.g., using memory capacity alert values corresponding to 50%, 75%, 90% or distance matrix values corresponding to 0, 1, and 3, respectively). In this example, the values in the distance matrix can convert the difference between 50% and 75% as being the same distance as the difference between 75% and 90% (e.g., non-linear). The non-linear correlation between these values can help emphasize/weight the relative importance of detecting a memory capacity between each of these values.

The monitoring device can create a profile of the user device's local memory in a particular period of time using these distances along a non-linear scale. The profile may help track the number of individual memory capacity alerts for the local memory in the user device.

In some examples, the profile of a period of time of the user device's local memory can be analyzed to identify patterns and anomalies across multiple profiles. For example, using the distance conversion of the memory capacity alert values to distances, the monitoring device can generate a time series dataset of the memory capacity alert values and their relative similarities. The time series dataset may comprise the distance values along a timeline that identifies when the memory capacity alert value was received. To maintain the order of the time series dataset, any gaps in days without memory capacity alerts may be represented with placeholders (e.g., null or Not a Number (NaN) values). The addition of placeholders can fill in the rest of the time series dataset without access to the memory capacity and other functionality of the user device, and create a numerical correlation between the memory capacity alert values and a significance of the similarity between them. This data structure can enable chronological tracking, with gaps in the dataset that are preserved to reflect real-world irregularities in the occurrences of the alerts.

Over time and multiple alerts, similarities of the memory capacity alert values and corresponding distances between the values can be grouped into repeating patterns. The patterns in the received alerts can be grouped using a clustering process or statistical thresholds. For example, in clustering, similar daily usage alert profiles can be grouped to create a cluster of days with similar profiles. The clusters can be further identified across a larger timeline and distances between new memory capacity alerts and the existing clusters may be determined for consistency and recurring patterns in the operations of the user device. When statistical thresholds are used, the monitoring device may determine when memory capacity alert values exceed statistical thresholds, so that the monitoring device can differentiate normal patterns from anomalies.

When deviations are detected between a new memory capacity alert/profile and the existing clusters/patterns, the monitoring device may identify an anomaly. The anomaly can be inferred as an anomaly in the operations of the user device, absent having access to the full operational history of the user device's memory.

In some examples, the anomaly may be determined by calculating the distance between the new alert and the nearest defined cluster to determine whether the distance exceeds a threshold. If any time periods deviate from the nearest cluster or exceed statistical limits, the monitoring device can flag the time periods as anomalous. In some examples, profiles with multiple high-threshold alerts (e.g., several 90% alerts that deviate from the determined clusters) may be prioritized as potential capacity issues.

In response to determining the anomaly, the monitoring device can transmit a second alert to the user about the deviation in the typical pattern of its memory device capacity (e.g., where the first alert is the original memory capacity alert generated by the user device itself). The user can take some action in response to the second alert, like deleting/cleaning up the memory device, adding more memory capacity, or executing a local command to reclaim memory capacity (e.g., DEFRAG, ZIP). These actions can positively affect the operation of the user device and allow the user device to execute its operations more smoothly and efficiently.

In some examples, the monitoring device can improve the anomaly detection process over time. For example, the alert threshold values associated with the distance matrix may be determined as default values (e.g., 50% memory capacity, 75% memory capacity, and 90% memory capacity) and adjusted over time in response to the clustering process described herein. In another example, the values in the distance matrix may be determined (e.g., 0, 1, 2 to create a non-linear correlation between the memory capacity alerts and the weights of each alert) and adjusted over time (e.g., to create a greater correlation/distinction between two alert values).

Various additional technical improvements are described throughout the disclosure. For example, the monitoring device can tune the anomaly detection process by adjusting distance metrics or clustering parameters, or otherwise adjusting similarity thresholds based on known historical data. For example, at a later time, the monitoring device can return to the historical data and determine if an action was initiated to fix the memory capacity usage based on the received memory capacity threshold values. This can help assess the anomaly performance with historical data to help ensure that the monitoring device can effectively detect past capacity issues. By tuning these parameters, the monitoring device can improve the memory capacity prediction accuracy. The monitoring device can also run more efficiently in response to this tuning process.

FIG. 1 is an illustrative monitoring device configured to detect memory capacity anomalies in sparse data environments, in accordance with examples discussed herein. For example, monitoring device 100 may be a server computer, a controller, or any other similar computing component capable of processing data from a client device received via a communication network.

In the example implementation of FIG. 1, monitoring device 100 includes hardware processor 102 and machine-readable storage medium 104. Machine-readable storage medium 104 comprises several modules and engines configured to perform the operations discussed throughout the disclosure, including device operations module 106, profile module 108, time series dataset generation module 110, clustering module 112, anomalies module 114, and alert module 116.

In some examples, device operations module 106, profile module 108, time series dataset generation module 110, clustering module 112, anomalies module 114, and alert module 116 may be implemented as a set of program instructions which when executed by hardware processor 102 may cause hardware processor 102 to perform respective functions. In certain examples, in an alternative or in addition to retrieving and executing instructions via hardware processor 102, device operations module 106, profile module 108, time series dataset generation module 110, clustering module 112, anomalies module 114, and alert module 116 may be implemented as one or more electronic circuits that include electronic components for performing the functionality of one or more instructions, such as an field-programmable gate array (FPGA), application-specific integrated circuit (ASIC), digital circuits including combinations of logic gates, or other electronic components. In some other examples, device operations module 106, profile module 108, time series dataset generation module 110, clustering module 112, anomalies module 114, and alert module 116 may be implemented as a virtual computing resource, such as a virtual machine, a container, a pod, or the like, executing on a common host computing node or different host computing nodes.

Monitoring device 100 may also be in communication with various data stores, including device operations data store 120, threshold data store 122, alert time series data store 124, and profile data store 126. Each of the data stores may store data in a defined format that is accessible by monitoring device 100, as described throughout the disclosure.

Device operations module 106 is configured to receive a first memory capacity alert. The memory capacity alert may be generated by the user device and stored in device operations data store 120. The alert from the user device, for example, may be generated internally or locally by the user device to detect potential memory capacity issues based on local monitoring of the user device. The user device may comprise a local memory and the memory capacity alerts may identify fluctuations or potential issues with the capacity of the memory reaching a threshold value. The capacity of the memory may correspond to the state of the memory. Other types of states of the memory are available as well without diverting from the essence of the disclosure.

Profile module 108 is configured to generate a capacity alert profile of the user device and store the profile in profile data store 126. For example, the monitoring device may receive the alert from the user device over some threshold amount. The threshold amount may correspond to a memory capacity/usage value or a number of alerts (e.g., at least six alerts over an unknown period of time). Multiple alerts may be received by the monitoring device over a period of time.

Profile module 108 may generate a profile for the user device using the received memory capacity alerts during the period of time (e.g., all alerts received in a day from the user device). The profile can track/plot the capacity usage of the user device from the point of view of the external monitoring device (e.g., without access to the complete operations documented in time series data). The profile may include (1) the capacity alert values for a period of time (e.g., one day), (2) a distance measurement between the capacity values in the alerts (e.g., to measure the "intensity" of the alerts for the period of time), (3) a variance value (e.g., showing the variability in alert levels), and (4) a minimum/maximum distance between the alerts (e.g., to measure the range of alert levels for the period of time). The profile corresponding to these data types can be added to profile data store 126.

In some examples, the profile is generated, in part, using a distance matrix of distance values. For example, profile module 108 may convert the memory capacity alert values to a different scale than a linear scale using the distance matrix by comparing two memory capacity values in two memory capacity alerts and converting the difference between the memory capacity values to a first value/distance.

The use of the distance defined in the distance matrix can help quantify the similarity between the memory capacity alert values. For example, 50% memory capacity to 75% memory capacity may be defined as having a similar importance as the difference between a 75% memory capacity to a 90% memory capacity (e.g., non-linear). In other examples, the memory capacity values may be converted to distances with linear relationships without diverting from the essence of the disclosure. Based on the defined similarity, the distance matrix can define the distances between these memory capacity alert values as being the same distance, irrespective of the non-linear nature of the actual values (e.g., using memory capacity alert values corresponding to 50%, 75%, 90% or distance matrix values corresponding to 0, 1, and 3, respectively). In this example, the values in the distance matrix can convert the difference between 50% and 75% as being the same distance as the difference between 75% and 90% (e.g., non-linear). The non-linear correlation between these values can help emphasize/weight the relative importance of detecting a memory capacity between each of these values. The distances and corresponding memory capacity alert values may be stored in distance data store 122. Additional detail on the distance matrix is provided with FIG. 3. Additional detail on the clustering of the distances from the alert values is provided with FIG. 4. Additional detail on the profile is provided with FIG. 5.

Time series dataset generation module 110 is configured to add the profiles to a time series dataset. The time periods without capacity alerts from the user device may be represented with placeholders (e.g., null or Not a Number (NaN) values). This data structure can enable chronological tracking, with gaps in the dataset that are preserved to reflect real-world irregularities in alert occurrence.

Time series dataset generation module 110 is also configured to generate a time series dataset from the distance values stored in the profile. The time series dataset may comprise the data points associated with each of the alerts that are received from the user device. The time series dataset may also comprise null or Not a Number (NaN) values for the time values where there were no memory capacity alerts by the user device. The time series dataset may be stored in alert time series data store 124.

Clustering module 112 is configured to initiate a clustering process of the time series dataset. In general, the clustering process may rely on a metric (e.g., Euclidean distance) to determine the similarity between data points in the time series dataset (e.g., corresponding to the distances between memory capacity alert values in the profiles of the user device). The output of the clustering process may correspond to a set of clusters where each cluster contains data points that are more similar to each other. In some examples, the clusters can be further identified across a larger timeline and distances between new memory capacity alerts and the existing clusters may be determined for consistency and recurring patterns in the operations of the user device.

Various clustering processes may be implemented. For example, a K-means clustering process may be implemented to divide the time series dataset into a defined number of clusters. The profiles in the cluster can be associated with other values in the cluster by a similarity threshold value defined by the clustering process.

In another example, hierarchical clustering may be implemented to build a tree of clusters based on hierarchical relationships. The profiles in the tree of clusters may be associated with each other as nodes in the tree. The nodes in the tree along one branch of the tree may be associated by a similarity threshold value defined by the clustering process.

In another example, a Density-Based Spatial Clustering of Applications with Noise (DBSCAN) may be implemented to identify clusters based on the density of data points and can handle any outliers in the data. In another example, a Gaussian Mixture Models (GMM) may be implemented to use a probabilistic approach to find clusters from a mixture of several Gaussian distributions. While these clustering processes are illustrative, other grouping algorithms may be implemented without diverting from the essence of the disclosure.

Anomalies module 114 is configured to initiate an anomaly detection process of the clusters to identify anomalies/outliers in the clusters. The anomalies can be data points that deviate from the typical pattern observed within their assigned cluster. Various anomaly detection processes may be implemented. For example, DBSCAN can measure the density of points in each of the clusters and the anomaly may be any data point that exists in areas of low density or are not reachable from any other point in a cluster. In another example, a Gaussian Mixture Models (GMM) can measure the distributions in the data, and the anomaly may be a data point that does not fit well with any of the components of the GMM. While these anomaly detection processes are illustrative, other algorithms that are configured to determine anomalies or other distinctions in clusters may be implemented without diverting from the essence of the disclosure.

Anomalies module 114 may identify any types of anomalies that are based on any fluctuations to the user device's memory. For example, the anomalies may include, for example, the storing additional data (to decrease the available memory and increase the used memory) or removing/deleting data (to increase the available memory). The anomalies may be determined between clusters or, in some examples, in comparing profiles for different periods of time.

Alert module 116 is configured to transmit a second memory capacity alert to the user device associated with the profile. In some examples, the second alert may be transmitted in response to detecting the anomaly or in response to detecting a threshold number of anomalies. Other detected activities of the user device or monitoring device may trigger transmitting the second alert without diverting from the essence of the disclosure.

In some examples, the alert is a second memory capacity alert that is transmitted to the user device in response to detecting the anomaly in the time series data. The alert can include information about the deviation in the typical pattern of its memory device capacity (e.g., where the first alert is the original memory capacity alert generated by the user device itself). The user can take some action in response to the second alert, like deleting/cleaning up the memory device, adding more memory capacity, or executing a local command to reclaim memory capacity (e.g., DEFRAG, ZIP). In some examples, the monitoring device can adjust distance metrics, cluster parameters, or thresholds based on known historical data based on the second alert.

Figure 2:
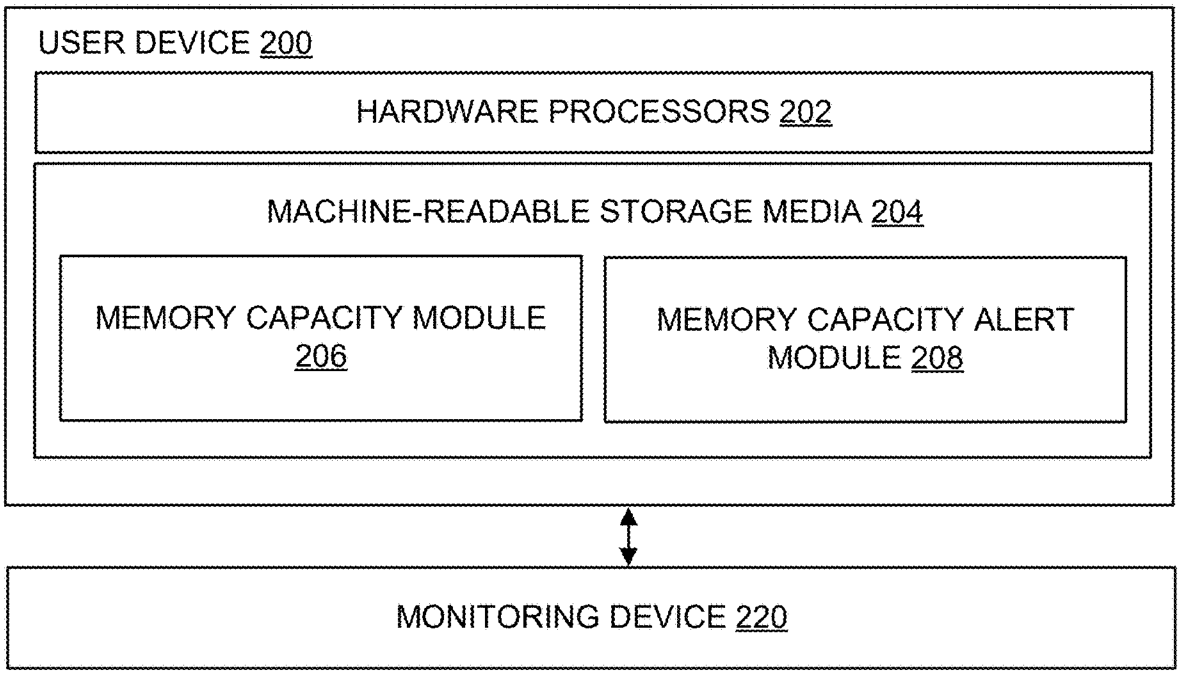
FIG. 2 is an illustrative user device in communication with the monitoring device, in accordance with examples discussed herein.

FIG. 2 is an illustrative user device in communication with the monitoring device, in accordance with examples discussed herein. For example, user device 200 may be a storage array device, managed user computer, mobile device, or any other similar computing component capable of monitoring a local memory, generating alerts associated with the capacity of the memory, and transmitting data to a monitoring computer via a communication network.

In this example, user device 200 includes hardware processor 202 and machine-readable storage medium 204. Machine-readable storage medium 204 comprises several modules and engines configured to perform the operations discussed throughout the disclosure, including memory capacity module 206 and memory capacity alert module 208. User device 200 may interact with computing device 220 to transmit memory capacity alerts to monitoring device 220.

In some examples, memory capacity module 206 and memory capacity alert module 208 may be implemented as a set of program instructions which when executed by hardware processor 202 may cause hardware processor 202 to perform respective functions. In certain examples, in an alternative or in addition to retrieving and executing instructions via hardware processor 202, memory capacity module 206 and memory capacity alert module 208 may be implemented as one or more electronic circuits that include electronic components for performing the functionality of one or more instructions, such as an FPGA, ASIC, digital circuits including combinations of logic gates, or other electronic components. In some other examples, memory capacity module 206 and memory capacity alert module 208 may be implemented as a virtual computing resource, such as a virtual machine, a container, a pod, or the like, executing on a common host computing node or different host computing nodes.

Memory capacity module 206 may be configured to track the capacity of the memory. For example, the capacity of the memory may be tracked by a downloadable software agent that is installed locally at the device. In some examples, the capacity of the memory may be tracked by pre-installed tracking software that operates as a background set of operations that track the state of components of the device (e.g., the memory).

The capacity of the memory may fluctuate in various states, from low available capacity (e.g., 90%) to high available capacity (e.g., 50%). In other examples, the capacity of the memory may be tracked as the memory capacity that is filled with data, for example, low capacity (e.g., 50%) to high capacity (e.g., 90%).

Memory capacity alert module 208 is configured to generate an alert. The alert may be associated with the memory coupled with the user device regarding how space/capacity is getting consumed within the user device. In some examples, the alert may also be provided to an interface of the user device (e.g., for a local presentation of the alert). The alert provided to the interface may identify a memory capacity issue that is currently occurring with the local memory of the device. The capacity alert may identify, for example, the memory capacity that is currently taken by stored data or the capacity available/open to store more data.

Figure 3:
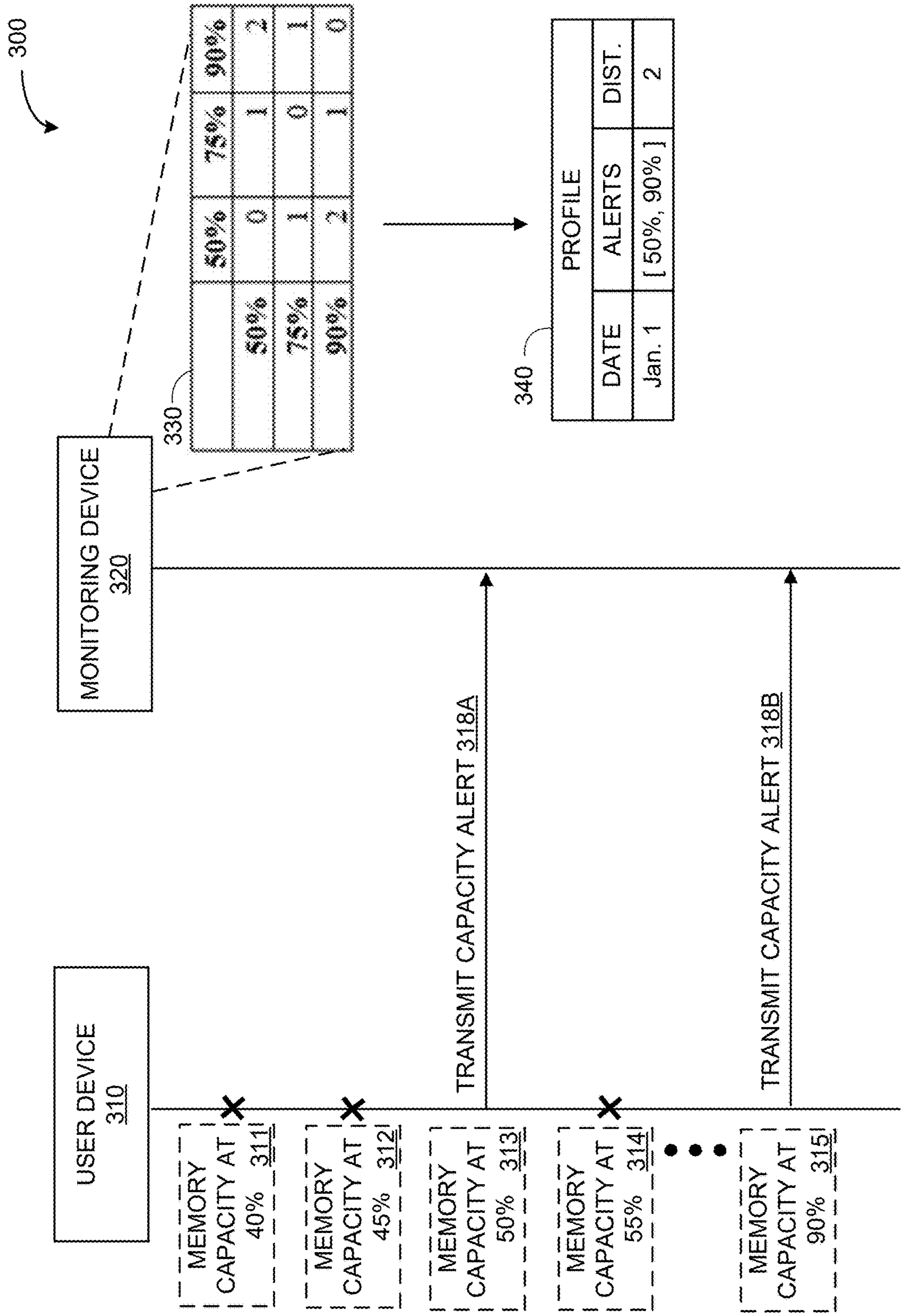
FIG. 3 depicts an interaction diagram illustrating memory capacity alerts transmitted from a user device to a monitoring device, which implements a distance matrix, in accordance with examples discussed herein.

FIG. 3 depicts an interaction diagram 300 illustrating memory capacity alerts transmitted from a user device 310 to a monitoring device 320, which implements a distance matrix 330, in accordance with examples discussed herein. In this example, the distance matrix of alert threshold values can correlate the distance between the memory capacity alert values to the state of the memory in the user device. The thresholds may be stored in a distance data store.

For example, user device 310 may track the memory capacity of the local memory over time. The memory capacity of the local memory at user device 310 may fluctuate across a period of time, for example, by storing additional data (to decrease the available memory and increase the used memory) or removing/deleting data (to increase the available memory). In this example, user device 310 may identify the memory capacity at multiple instances across a period of time, including a first memory capacity 311 at 40%, a second memory capacity 312 at 45%, a third memory capacity 313 at 50%, a fourth memory capacity 314 at 55%, and a fifth memory capacity 315 at 90%. Various memory capacity alert values may be implemented by the user device without diverting from the essence of the disclosure.

User device 310 may generate memory capacity alerts (illustrated as first memory capacity alert 318A and second memory capacity alert 318B) that identify fluctuations or potential issues with the capacity of the memory reaching a threshold value. User device 310 may transmit memory capacity alerts 318A-318B at determined memory capacity values to monitoring device 320. The memory capacity alert values illustrated in FIG. 3 include 50% and 90%, although any memory capacity values may be implemented in association with the alerts. The memory capacity alerts 318A-318B may be generated internally or locally by the user device to detect potential memory capacity issues based on local monitoring of the user device. The user device may comprise a local memory and the memory capacity alerts may identify fluctuations or potential issues with the capacity of the memory reaching a threshold value.

When monitoring device 320 receives at least one of the memory capacity alerts 318A-318B from user device 310, the alert may include the value of the capacity usage of the memory. Monitoring device 320 can compare the value in the memory capacity alert to the value in the distance matrix 330. In some examples, the distance matrix 330 can quantify the similarity between different memory capacity alert values. In this example, the alert threshold values defined by the monitoring device include 50%, 75%, 90% as examples, although any threshold values may be implemented. The monitoring device can use the distance matrix to define relative similarities between the threshold values. For example, 50% memory capacity to 75% memory capacity may be defined as a single distance that is the same as the distance between 75% memory capacity and 90% memory capacity. In some examples, the distance matrix may be implemented as an identity matrix, where the geometric transformation of the identity matrix of the user device remains unchanged by the transformation and preserves the shape of the distance values.

In response to receiving an alert from the user device, the monitoring device can determine whether the memory capacity identified in the alert matches the defined threshold value in the distance matrix 330. When the received alert matches a stored threshold value, the memory capacity value from the alert and the distance from the distance matrix may be added to the profile 340 for the user device. The profile 340 may help track the memory capacity alert values and operations of the user device 310 over a period of time (e.g., without access to the complete operations documented in time series data). In some examples, the profile 340 may include the capacity alert values for a period of time (e.g., one day) and the distance measurement between the capacity values in the memory capacity alerts 318A-318B.

FIG. 4 illustrates a profile 400 comprising memory capacity alerts and distances between the memory capacity alerts, in accordance with examples discussed herein. The profile may include (1) dates 410 where one or more memory capacity alerts were received, (2) the capacity alert values 420 for a period of time (e.g., one day), (3) a distance measurement 430 between the capacity values in the alerts (e.g., to measure the "intensity" of the alerts for the period of time), (4) a variance value 440 (e.g., showing the variability in alert levels), (5) a minimum distance 450 between the memory capacity alerts (e.g., to measure the range of alert levels for the period of time), and (6) a maximum distance 460 distance between the alerts (e.g., to measure the range of alert levels for the period of time). In some examples, a profile of a period of time may correspond to a single row in the data store.

In some examples, the profile may include any time periods without memory capacity alerts being received by the monitoring device. The time periods without alerts from the user device may be represented with placeholders (e.g., null or NaN values). This data structure can enable chronological tracking, with gaps in the dataset that are preserved to reflect real-world irregularities in alert occurrence.

Figure 5:
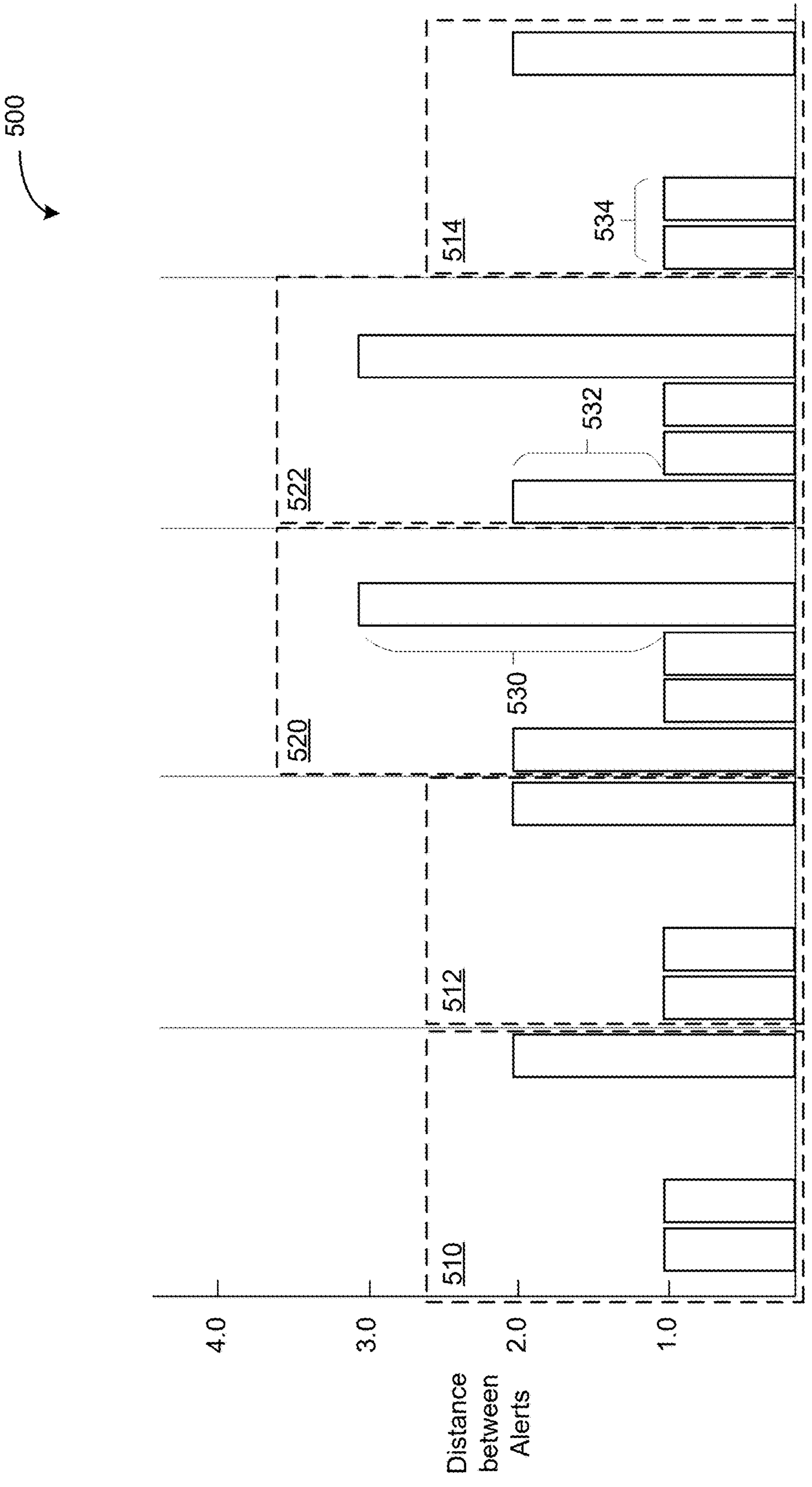
FIG. 5 depicts a graphical representation illustrating clusters of distances between memory capacity alert values in a profile, in accordance with examples discussed herein.

FIG. 5 depicts a graphical representation 500 illustrating clusters of distances between memory capacity alert values in a profile, in accordance with examples discussed herein. For example, the monitoring device can initiate a clustering process (e.g., k-means, hierarchical clustering) on the distances between the alerts to identify groups distances that are similar. The alerts corresponding to the period of time may be grouped together in a profile of the memory, and the clustering process can identify similar profiles/alerts over a period of time.

The clustering process may identify multiple clusters 510, 512, 514, 520, 522. Each cluster may include a set of distances that are similar across more than one period of time. For example, a first cluster 510, second cluster 512, and third cluster 514 includes similar distances between memory capacity alert values in a period of time (e.g., 1, 1, 0, 0, 2), as defined by the distance matrix, while a fourth cluster 520 and fifth cluster 522 includes similar distances between memory capacity alert values in a period of time (e.g., 2, 1, 1, 3, 0).

Various other clusters may be defined. For example, one type of cluster may include profiles/days that correspond to "low alerts," where the alerts from the user device show low relative fluctuation in the capacity usage of the user device. The memory capacity may be operated fairly consistently across the monitored period of time with respect to the values identified for the memory capacity alerts in the distance matrix. Another cluster may include profiles/days that correspond to "mixed alerts," where the alerts from the user device show that the capacity usage of the user device is operating with greater fluctuation between the memory capacity alerts. Yet another cluster may include profiles/days that correspond to "high alerts," where the alerts from the user device show that large fluctuations in the memory capacity of the user device.

In another illustrative example, the clusters may correspond to the memory capacity values identified in the alert. In other words, one type of cluster may include profiles/days that correspond to "low alerts," as the value of the memory capacity identified in the alert. (e.g., 50% of the capacity at the user device is used), another cluster may include "mixed alerts" (e.g., both 50% capacity usage and 75% capacity usage alerts are received from the user device), and yet another cluster may include "high alerts" (e.g., 90% of the capacity at the user device is used). Alternatively, the monitoring device can compute statistical measures (e.g., mean and standard deviation) across the historical dataset to set ranges for each grouping of alerts (or other summary statistic). In each of these examples, the number of alerts that are received by the monitoring device may be grouped in a cluster that is determined by the monitoring device, which can identify how many times the user device reached this particular memory capacity threshold.

In FIG. 5, the clusters may be provided based on distances between the alerts that are stored in the profiles for the user device. A first cluster may correspond to first profile day 510, second profile day 512, and fifth profile day 514, which have similar distance patterns throughout the time series dataset. For example, each of these profile days include two distances corresponding to a one value, followed by two distances corresponding to a zero value, and one distance corresponding to a two value. A second cluster may correspond to third profile day 520 and fourth profile day 522, which also have similar distance patterns throughout the period of time. For example, each of these profile days include one distance corresponding to a two value, followed by two distances corresponding to a one value, one distance corresponding to a three value, and one distance corresponding to a zero value.

The distinction between the distances can identify the fluctuation between the values in the memory capacity alerts that are received by the monitoring device. In a first example 530, the memory capacity value in a first memory capacity alert identifies a one value and the second memory capacity alert identifies a three value. The cluster of profiles may correspond to "high alerts" or relatively large fluctuations in a period of time that are identified by the monitoring device.

In a second example 532, the memory capacity value in a first memory capacity alert identifies a two value and the second memory capacity alert identifies a one value. The cluster of profiles may correspond to "mixed alerts" or relatively mid-size fluctuations in a period of time that are identified by the monitoring device.

In a third example 534, the memory capacity values in two memory capacity alerts are the same. The cluster of profiles may correspond to "low alerts" with little to no fluctuations in a period of time that are identified by the monitoring device.

Figure 6:
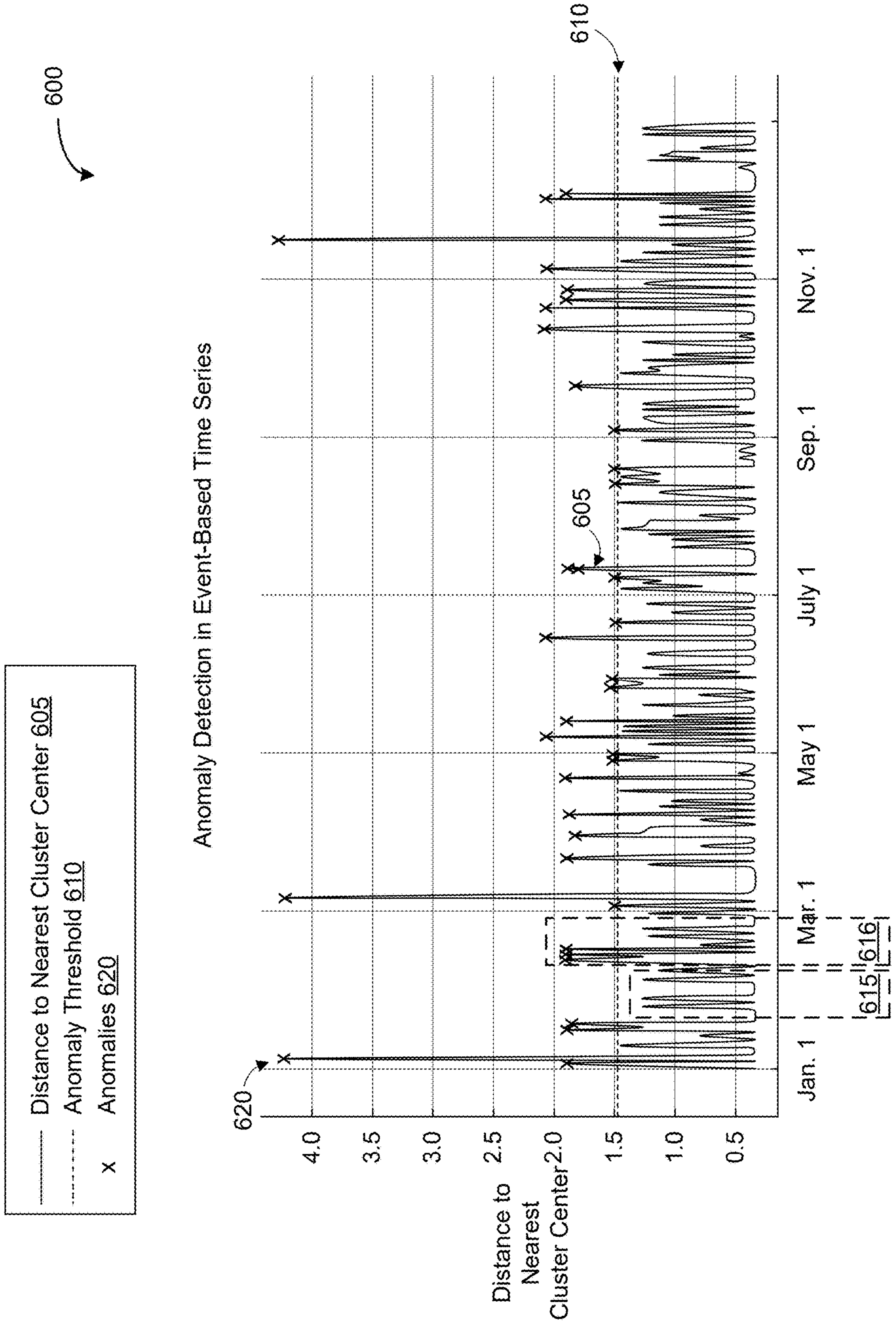
FIG. 6 illustrates a chart of anomalies across clusters for a user device, in accordance with examples discussed herein.

FIG. 6 illustrates a chart 600 of distances and anomalies across clusters for a user device, in accordance with examples discussed herein. In this example, distances 605 have been used to generate a time series dataset that correlates the clustered distances along at timeline. Any common sets of distances are grouped in clusters 615, 616. The chart also shows the distances 605 compared to an anomaly threshold 610 (shown using a dashed line in the chart). The distances 605 that are above anomaly threshold 610 are shown as anomalies 620 (shown using cross signs) associated with the distance between data points and the cluster center are illustrated, as generated by the monitoring device.

For example, the monitoring device can initiate a clustering process on the profile for the user device. The clustering process (e.g., k-means, hierarchical clustering) can identify groups of time periods with similar profiles. In the provided example, various clusters are provided including a first cluster 615 and a second cluster 616. First cluster 615 may comprise "low alerts" (e.g., 50% memory capacity alert values with a minimal number of fluctuations between the values) and the second cluster 616 may comprise "mixed alerts" (e.g., 50% or 75% alert values with a mixed number of fluctuations between the values).

In this example, the variation in the identified distances are shown as spikes (e.g., the anomalies 620) in the chart. As described above, distance 605 is determined in accordance with the distance matrix of alert threshold values. For example, when the distance between the values is given a higher weight (e.g., 50% to 90% is weight "2" versus 50% to 75% is weight "1"), as defined in the distance matrix. The spike/anomaly 620 corresponding to the greater distances may be greater as well. The clusters 615, 616 may be determined using clustering methods described herein.

In some examples, a pattern of data points/distances may be determined and the clusters with data values above a determined threshold value 610. The distance 605 that exceeds the anomaly threshold 610 may be determined to be anomalous 620.

In some examples, the anomaly threshold 610 may be adjusted. For example, the adjustment to the anomaly threshold 610 may be initiated to maintain a determined percentage of the distance 605 between data points and the nearest cluster center below the anomaly threshold 610. As an illustrative example, the anomaly threshold 610 may be "1.5" and one-half of the clusters corresponding to the distance 605 between data points and the nearest cluster center exceed the threshold. In this case, the monitoring device may adjust the anomaly threshold 610 so that fewer distances 605 between data points and the nearest cluster center exceed the anomaly threshold 610. This adjustment may correspond to storing a new anomaly threshold 610 as "2.0."

In some examples, the values of the distance matrix may be adjusted, which can affect the distance 605 between data points and the nearest cluster center. For example, the alert threshold values in the distance matrix may be adjusted from 50% memory capacity, 75% memory capacity, and 90% memory capacity (corresponding to weights 0, 1, and 2) to 50% memory capacity, 75% memory capacity, and 95% memory capacity (corresponding to weights 0, 1, and 3). This adjustment may correlate a greater weight to the alert threshold values in sporadic data when the alert threshold value identifies the 95% memory capacity (e.g., at "3") rather than the sporadic data that identifies the 90% memory capacity to help signify extremely anomalous data in the memory capacity alerts.

Using the clusters, the monitoring device may detect the anomaly in the sporadic data. The anomaly detection can, for example, calculate the distance between the new alert and the nearest predefined cluster or determine if a summary statistic exceeds its threshold. If any time periods deviate from the nearest cluster or exceed statistical limits, the monitoring device can flag the time periods as anomalous.

Days with multiple high-threshold alerts (e.g., several 90% alerts) may be prioritized as potential capacity issues.

Figure 7:
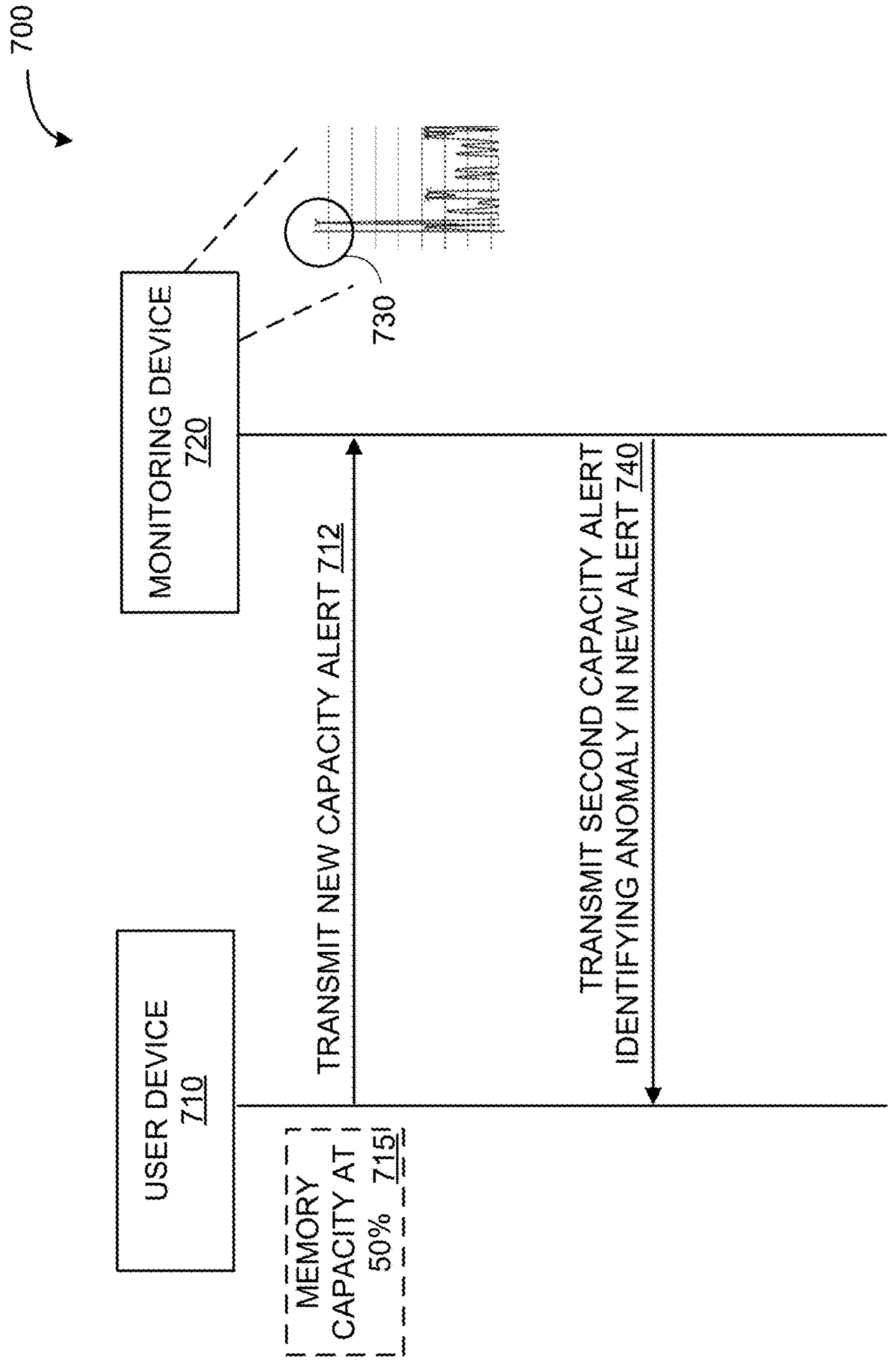
FIG. 7 depicts an interaction diagram illustrating a new memory capacity alert and a second memory capacity alert identifying an anomaly which is transmitted from the monitoring device to a user device, in accordance with examples discussed herein.

FIG. 7 depicts an interaction diagram 700 illustrating a new memory capacity alert 712 and a second memory capacity alert 740 identifying an anomaly which is transmitted from the monitoring device 720 to a user device 710, in accordance with examples discussed herein. For example, a new memory capacity alert 712 may be transmitted from the user device 710 to the monitoring device 720 after a profile has been generated by monitoring device 720 of the user device's memory. As described herein, a new memory capacity alert 712 may be generated when the memory capacity/usage of the memory exceeds a threshold value 715, like 50%. At that time, the user device 710 may generate a new memory capacity alert 712 with the memory capacity alert value identifying that the memory capacity has reached the threshold value.

Monitoring device 720 may compare the memory capacity alert value in the new memory capacity alert 712 (or the corresponding distance between multiple memory capacity alert values) to the existing profile of the user device. In response to determining that a similarity value between the memory capacity alert value or distance and an existing cluster exceeds a similarity threshold value, the new memory capacity alert 712 may be identified as anomalous 730, as described throughout the disclosure.

In some examples, the anomaly 730 may be determined by calculating the similarity value between a new alert from user device 710 and the existing cluster to determine whether the distance exceeds the similarity threshold value. If any time periods deviate from the nearest cluster or exceed statistical limits, monitoring device 720 can flag the data points or corresponding time periods as anomalous. In some examples, days with multiple high-threshold alerts (e.g., several 90% alerts that deviate from the determined clusters) may be prioritized as potential capacity issues.

In response to identifying that the new memory capacity alert 712 is anomalous 730, monitoring device 720 may generate and transmit a second alert 740 back to the user device 710 associated with the potentially anomalous activity. The anomaly 730 may correspond to a deviation in the typical pattern of its memory device capacity (e.g., where the first alert is the original memory capacity alert generated by the user device itself).

The second alert 740 can include a memory capacity value of the local memory, based on detected pattern of memory capacity alert values over a period of time. Upon detecting the anomaly 730 in the distance comparisons between the memory capacity alert values, the monitoring device 720 may generate the second alert 740 identifying deviations from the traditional groupings/clusters identified in the data.

In some examples, the monitoring device 720 can transmit a second alert 740 to the user device 710 about the deviation in the typical pattern of its memory device capacity (e.g., where the first alert is the original memory capacity alert generated by the user device itself). In some examples, the alert comprises a suggestion to the user of the user device. The suggestion may include, for example, a suggestion to delete or clean up the memory at the user device or to add memory capacity at the user device.

In some examples, the alert comprises a command that adjusts the memory at the user device. For example, the command may be a local command to reclaim memory capacity at the user device. In another example, the command comprises an automated adjustment of a parameter of the profile.

The user can take some action in response to the second alert, like deleting/cleaning up the memory device, adding more memory capacity, or executing a local command to reclaim memory capacity (e.g., DEFRAG, ZIP). These actions can positively affect the operation of the user device and allow the user device to execute its operations more smoothly and efficiently.

In some examples, the monitoring device can adjust distance metrics, cluster parameters, or thresholds based on known historical data. By tuning these parameters, the monitoring device can improve the memory capacity prediction accuracy. The monitoring device can also run more efficiently in response to this tuning process.

Figure 8:
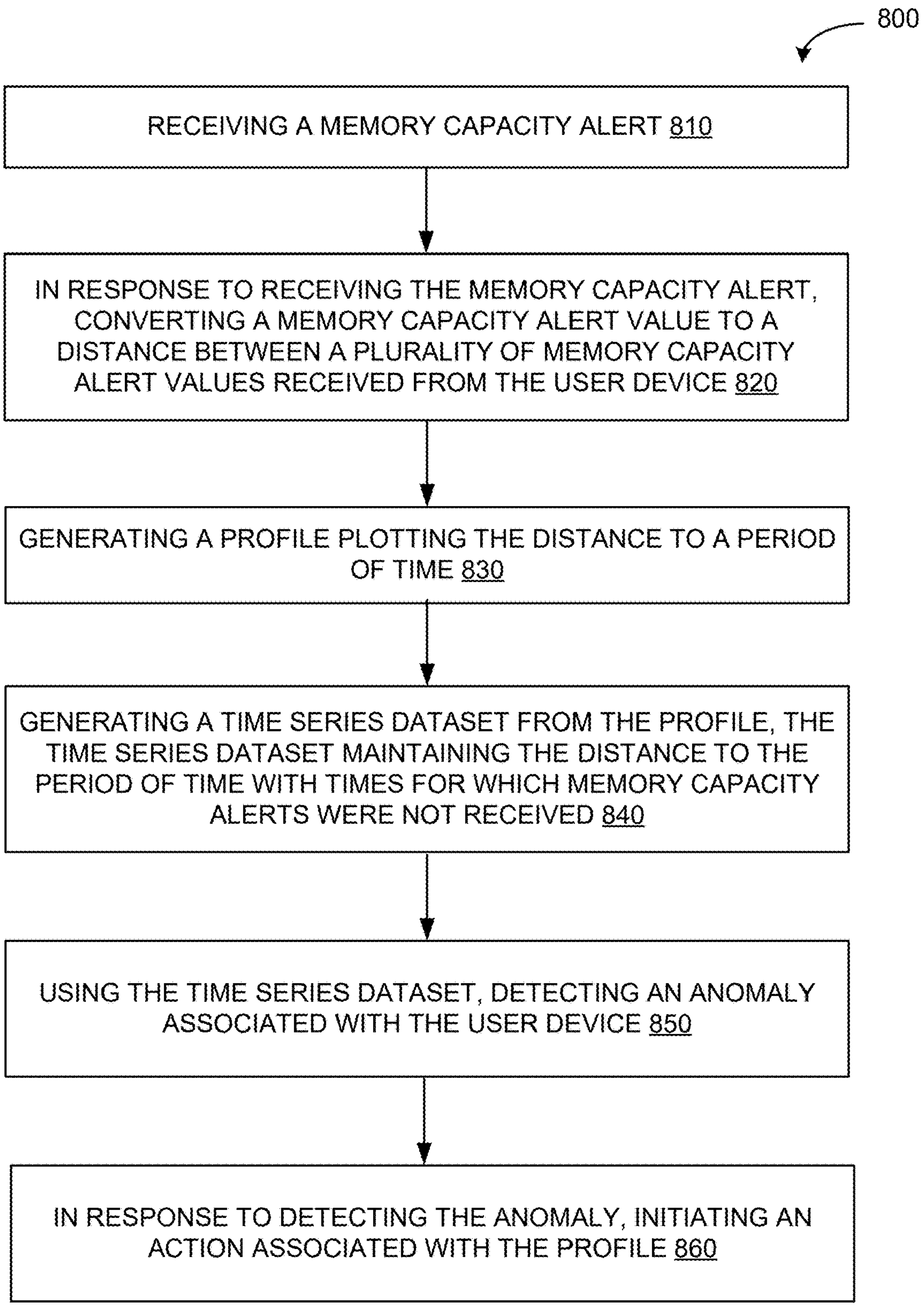
FIG. 8 is a process that may be used to implement examples of the disclosed technology.

FIG. 8 is a process 800 that may be used to implement examples of the disclosed technology. In this example, the process 810-860 may be performed by a monitoring device (comprising a memory and a processor) in communication with a user device.

At operation 810, the process may receive a memory capacity alert. For example, a monitoring device may receive a memory capacity alert associated with a user device. The memory capacity alert may be generated locally by the user device and the user device may comprise the memory that is associated with the memory capacity alert.

At operation 820, the process may convert a memory capacity alert value to a distance between a plurality of memory capacity alert values received from the user device. For example, the memory capacity alert may include a memory capacity alert value that is converted to the distance. The conversion may be initiated in response to receiving the memory capacity alert. The distance may be measured based on the difference between memory capacity alert values that were received from the user device.

The distance conversion may be based on a distance matrix. The distance matrix can include correlations between the memory capacity alert values that the monitoring device can use to convert the values to the distances. For example, a distance of 0 indicates identical memory capacity alert values, a distance of 1 indicates moderate similarity (e.g., 50% memory capacity alert value to 75% memory capacity alert value), and a distance of 2 indicates a higher threshold difference (e.g., 50% memory capacity alert value to 90% memory capacity alert value).

At operation 830, the process may generate a profile plotting the distance to a period of time. For example, for each day, the monitoring device may create a profile that is summarizing the data from the memory capacity alerts and the distances generated using the distance matrix. If no memory capacity alerts are received for a given day, the monitoring device may add a placeholder value (e.g., NaN) to help maintain the timeline and distribution of the alerts.

At operation 840, the process may generate a time series dataset from the profile. The time series dataset may maintain the distance to the period of time with times for which memory capacity alerts were not received. In other words, profiles/days without alerts may be represented with placeholders (e.g., NaN values).

In some examples, the time series dataset may help organize the profiles into a time series for chronological analysis. The monitoring device may use the generated time series dataset for pattern detection over extended periods of time.

At operation 850, the process may use the time series dataset to detect an anomaly associated with the user device. For example, the monitoring device may learn typical patterns for when the memory capacity alerts are received from the user device. The user device may correspond to a pattern of capacity usage and the monitoring device can determine the deviations from these patterns.

In some examples, the monitoring device may calculate the distance from the memory capacity alert value for the current day to the closest profile (or the time series dataset in general). In another example, the monitoring device may determine if any summary statistic of the current profile exceeds a memory capacity threshold to identify the profile as potentially anomalous. The monitoring device may flag profiles as anomalous if they significantly deviate from the nearest cluster or exceed statistical limits. In some examples, the profiles with multiple high-threshold alerts (e.g., several 90% alerts) may be prioritized as potential memory capacity issues at the user device.

At operation 860, the process may initiate an action associated with the profile. For example, the action may be initiated in response to detecting the anomaly, like deleting/cleaning up the memory device, adding more memory capacity, or executing a local command to reclaim memory capacity (e.g., DEFRAG, ZIP).

Figure 9:
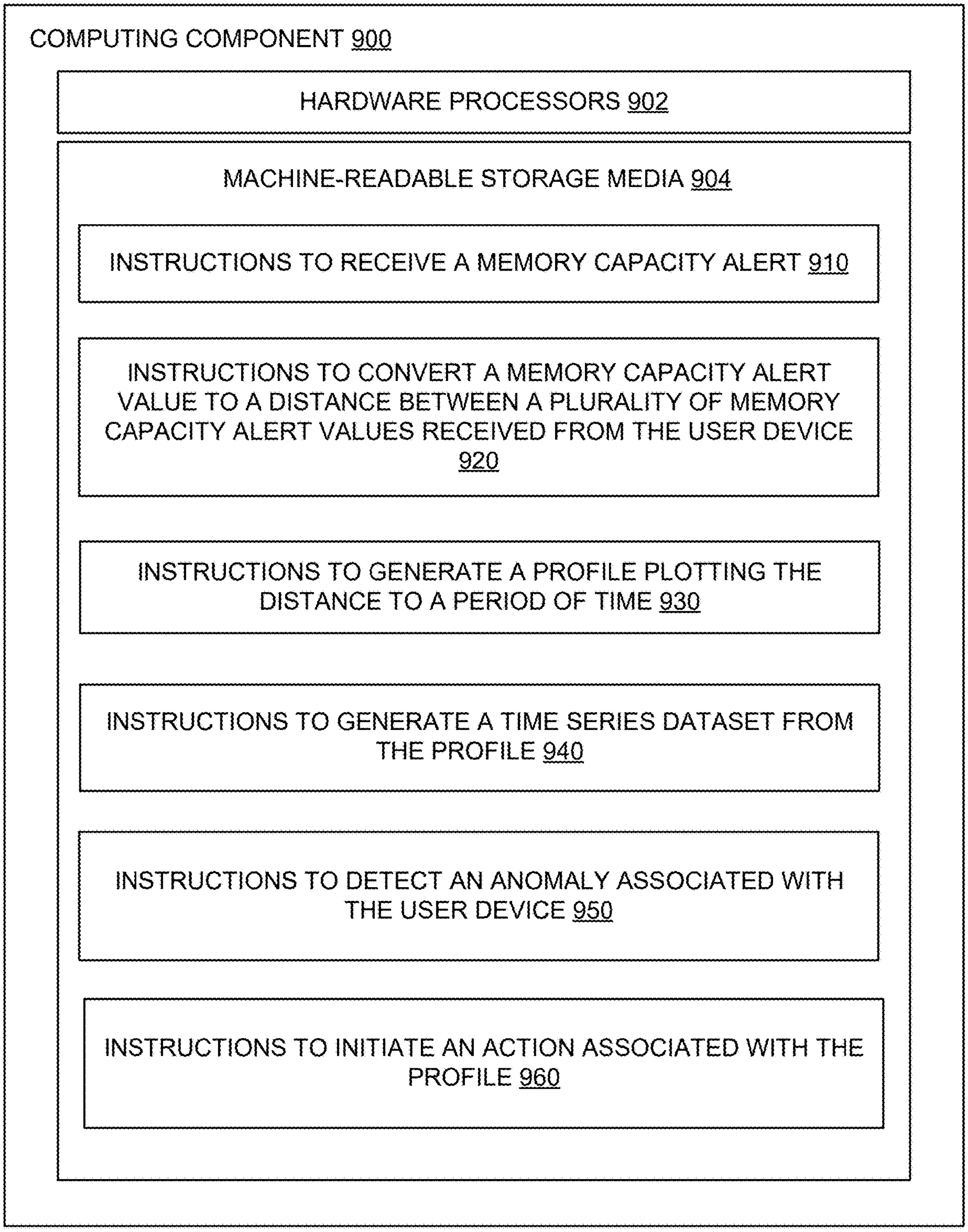
FIG. 9 is a computing component that may be used to implement examples of the disclosed technology.

FIG. 9 illustrates a computing component that may be used to detect memory capacity anomalies in sparse data environments, in accordance with various examples of the disclosed technology. Referring now to FIG. 9, computing component 900 may be, for example, a server computer, a controller, or any other similar computing component capable of processing data. In the example implementation of FIG. 9, the computing component 900 includes hardware processor 902 and machine-readable storage medium 904.

Hardware processor 902 may be one or more central processing units (CPUs), semiconductor-based microprocessors, and/or other hardware devices suitable for retrieval and execution of instructions stored in machine-readable storage medium 904. Hardware processor 902 may fetch, decode, and execute instructions, such as instructions 910-960, to control processes or operations for detecting memory capacity anomalies in sparse data environments. As an alternative or in addition to retrieving and executing instructions, hardware processor 902 may include one or more electronic circuits that include electronic components for performing the functionality of one or more instructions, such as a FPGA, ASIC, or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 904 may be a non-transitory storage medium, where the term "non-transitory" does not encompass transitory propagating signals. As described in detail below, machine-readable storage medium 904 may be encoded with executable instructions, for example, instructions 910-960.

Hardware processor 902 may execute instruction 910 to receive a memory capacity alert from a user device. The user device may comprise a memory and the memory capacity alert may be generated locally by the user device regarding the memory. In some examples, the alert from the user device may be generated internally or locally by the user device to detect potential memory capacity issues based on local monitoring of the user device. The user device may comprise a local memory and the memory capacity alerts may identify fluctuations or potential issues with the capacity of the local memory reaching a threshold value.

Hardware processor 902 may execute instruction 920 to convert a memory capacity alert value to a distance between a plurality of memory capacity alert values received from the user device. The memory capacity alert value may be included in the memory capacity alert.

Hardware processor 902 may execute instruction 930 to generate a profile plotting the distance to a period of time. In some examples, the profile can define the capacity usage of the user device from the point of view of the external monitoring device (e.g., without access to the complete operations documented in time series data). The profile may include (1) the capacity alert values for a time period (e.g., one day), (2) a distance measurement between the capacity values in the alerts (e.g., to measure the "intensity" of the alerts for the time period), (3) a variance value (e.g., showing the variability in alert levels), and (4) a minimum/maximum distance between the alerts (e.g., to measure the range of alert levels for the time period).

Hardware processor 902 may execute instruction 940 to generate a time series dataset from the profile. For example, the time series dataset may maintain the distance to the period of time with times for which memory capacity alerts were not received. In some examples, the distance may be maintained using the memory capacity alert values along with placeholder representations for times when no capacity alerts from the user device were received (e.g., null or NaN values) or memory capacity alerts were not generated.

Hardware processor 902 may execute instruction 950 to detect an anomaly associated with the user device. For example, the anomaly detection can calculate the distance been a new alert and the nearest predefined cluster or determine if a summary statistic exceeds its threshold. If any time periods deviate from the nearest cluster or exceed statistical limits, the monitoring device can flag the time periods as anomalous. In some examples, days with multiple high-threshold alerts (e.g., several 90% alerts) may be prioritized as potential capacity issues.

Hardware processor 902 may execute instruction 960 to initiate an action associated with the profile. The action may take various forms. For example, the monitoring device can transmit a second alert to the user about the deviation in the typical pattern of its memory device capacity (e.g., where the first alert is the original memory capacity alert generated by the user device itself). The user can take some action in response to the second alert, like deleting/cleaning up the memory device, adding more memory capacity, or executing a local command to reclaim memory capacity (e.g., DEFRAG, ZIP). These actions can positively affect the operation of the user device and allow the user device to execute its operations more smoothly and efficiently.

Figure 10:
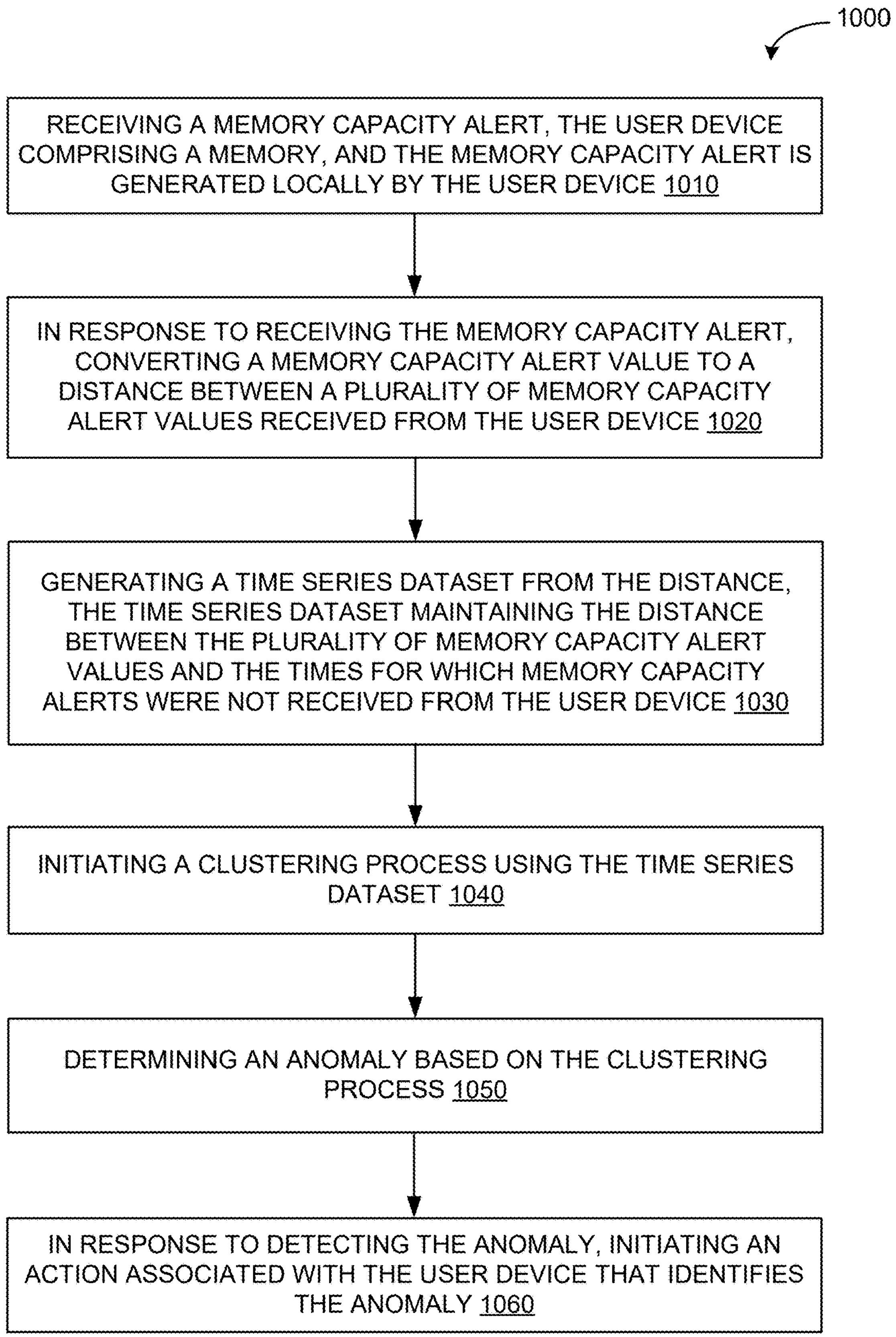
FIG. 10 is a process that may be used to implement examples of the disclosed technology.

FIG. 10 is a process 1000 that may be used to implement examples of the disclosed technology. In this example, the process 1010-1060 may be performed by a monitoring device (comprising a memory and a processor) in communication with a user device.

At operation 1010, the process may receive, from a user device, a memory capacity alert. The user device may comprise a memory and the memory capacity alert may be generated locally by the user device.

At operation 1020, the process may convert a memory capacity alert value to a distance between a plurality of memory capacity alert values received from the user device. The memory capacity alert value may be included in the memory capacity alert that is converted to the distance. The conversion may be initiated in response to receiving the memory capacity alert from the user device. The distance may be measured based on the difference between memory capacity alert values that were received from the user device.

The distance conversion may be based on a distance matrix. The distance matrix can include correlations between the memory capacity alert values that the monitoring device can use to convert the values to the distances. For example, a distance of 0 indicates identical memory capacity alert values, a distance of 1 indicates moderate similarity (e.g., 50% memory capacity alert value to 75% memory capacity alert value), and a distance of 2 indicates a higher threshold difference (e.g., 50% memory capacity alert value to 90% memory capacity alert value).

At operation 1030, the process may generate a time series dataset from the distance. The time series dataset may maintain the distance between the plurality of memory capacity alert values and the times for which memory capacity alerts were not received from the user device. If no memory capacity alerts are received for a given day, the monitoring device may add a placeholder value (e.g., NaN) to help maintain the timeline and distribution of the alerts that is also added to the time series dataset. In other words, time series dataset without alerts may be represented with placeholders.

At operation 1040, the process may initiate a clustering process using the time series dataset. In some examples, the time series dataset may help organize the profiles into a time series for chronological analysis for the clustering process. For example, the clustering process can group profiles/time periods with similar patterns of memory capacity alert values (e.g., using k-means, hierarchical clustering, or other clustering algorithm). When statistical thresholds are implemented, the monitoring device may compute statistical measures (e.g., mean and standard deviation) across the time series dataset to determine ranges for each memory capacity alert.

At operation 1050, the process may determine an anomaly based on the clustering process. The anomaly may be based on a similarity threshold. For example, in clustering, the profiles or memory capacity alert values that exceed a determined similarity threshold may be identified as anomalous. When the distance from the profile to the acceptable range exceeds a threshold, the profile or memory capacity alert value may be identified as anomalous.

At operation 1060, the process may initiate an action associated with the user device that identifies the anomaly. The action may be initiated in response to detecting the anomaly, like deleting/cleaning up the memory device, adding more memory capacity, or executing a local command to reclaim memory capacity (e.g., DEFRAG, ZIP).

FIG. 11 illustrates a computing component that may be used to detect memory capacity anomalies in sparse data environments, in accordance with various examples of the disclosed technology. Referring now to FIG. 11, computing component 1100 may be, for example, a server computer, a controller, or any other similar computing component capable of processing data. In the example implementation of FIG. 11, the computing component 1100 includes hardware processor 1102 and machine-readable storage medium 1104.

Hardware processor 1102 may be one or more central processing units (CPUs), semiconductor-based microprocessors, and/or other hardware devices suitable for retrieval and execution of instructions stored in machine-readable storage medium 1104. Hardware processor 1102 may fetch, decode, and execute instructions, such as instructions 1110-1160, to control processes or operations for detecting memory capacity anomalies in sparse data environments. As an alternative or in addition to retrieving and executing instructions, hardware processor 1102 may include one or more electronic circuits that include electronic components for performing the functionality of one or more instructions, such as a FPGA, ASIC, or other electronic circuits.

A machine-readable storage medium, such as machine-readable storage medium 1104, may be any electronic, magnetic, optical, or other physical storage device that contains or stores executable instructions. Thus, machine-readable storage medium 1104 may be, for example, RAM, NVRAM, EEPROM, a storage device, an optical disc, and the like. In some examples, machine-readable storage medium 1104 may be a non-transitory storage medium, where the term "non-transitory" does not encompass transitory propagating signals. As described in detail below, machine-readable storage medium 1104 may be encoded with executable instructions, for example, instructions 1110-1160.

Hardware processor 1102 may execute instruction 1110 to receive, from a user device, a memory capacity alert. The user device may comprise a memory and the memory capacity alert may be generated locally by the user device.

Hardware processor 1102 may execute instruction 1120 to convert a memory capacity alert value to a distance between a plurality of memory capacity alert values received from the user device. The memory capacity alert value may be included in the memory capacity alert. The conversion may be initiated in response to receiving the memory capacity alert.

Hardware processor 1102 may execute instruction 1130 to generate a time series dataset from the distance. The time series dataset may maintain the distance between the plurality of memory capacity alert values and the times for which memory capacity alerts were not received from the user device. If no memory capacity alerts are received for a given day, the monitoring device may add a placeholder value (e.g., NaN) to help maintain the timeline and distribution of the alerts that is also added to the time series dataset. In other words, time series dataset without alerts may be represented with placeholders.

Hardware processor 1102 may execute instruction 1140 to initiate a clustering process using the time series dataset. In some examples, the time series dataset may help organize the profiles into a time series for chronological analysis for the clustering process. For example, the clustering process can group profiles/time periods with similar patterns of memory capacity alert values (e.g., using k-means, hierarchical clustering, or other clustering algorithm). When statistical thresholds are implemented, the monitoring device may compute statistical measures (e.g., mean and standard deviation) across the time series dataset to determine ranges for each memory capacity alert.

Hardware processor 1102 may execute instruction 1150 to determine an anomaly based on the clustering process. The anomaly may be based on a similarity threshold. For example, in clustering, the profiles or memory capacity alert values that exceed a determined similarity threshold may be identified as anomalous. When the distance from the profile to the acceptable range exceeds a threshold, the profile or memory capacity alert value may be identified as anomalous.

Hardware processor 1102 may execute instruction 1160 to initiate an action associated with the user device that identifies the anomaly. In some examples, the action may be initiated in response to detecting the anomaly, like deleting/cleaning up the memory device, adding more memory capacity, or executing a local command to reclaim memory capacity (e.g., DEFRAG, ZIP).

Figure 12:
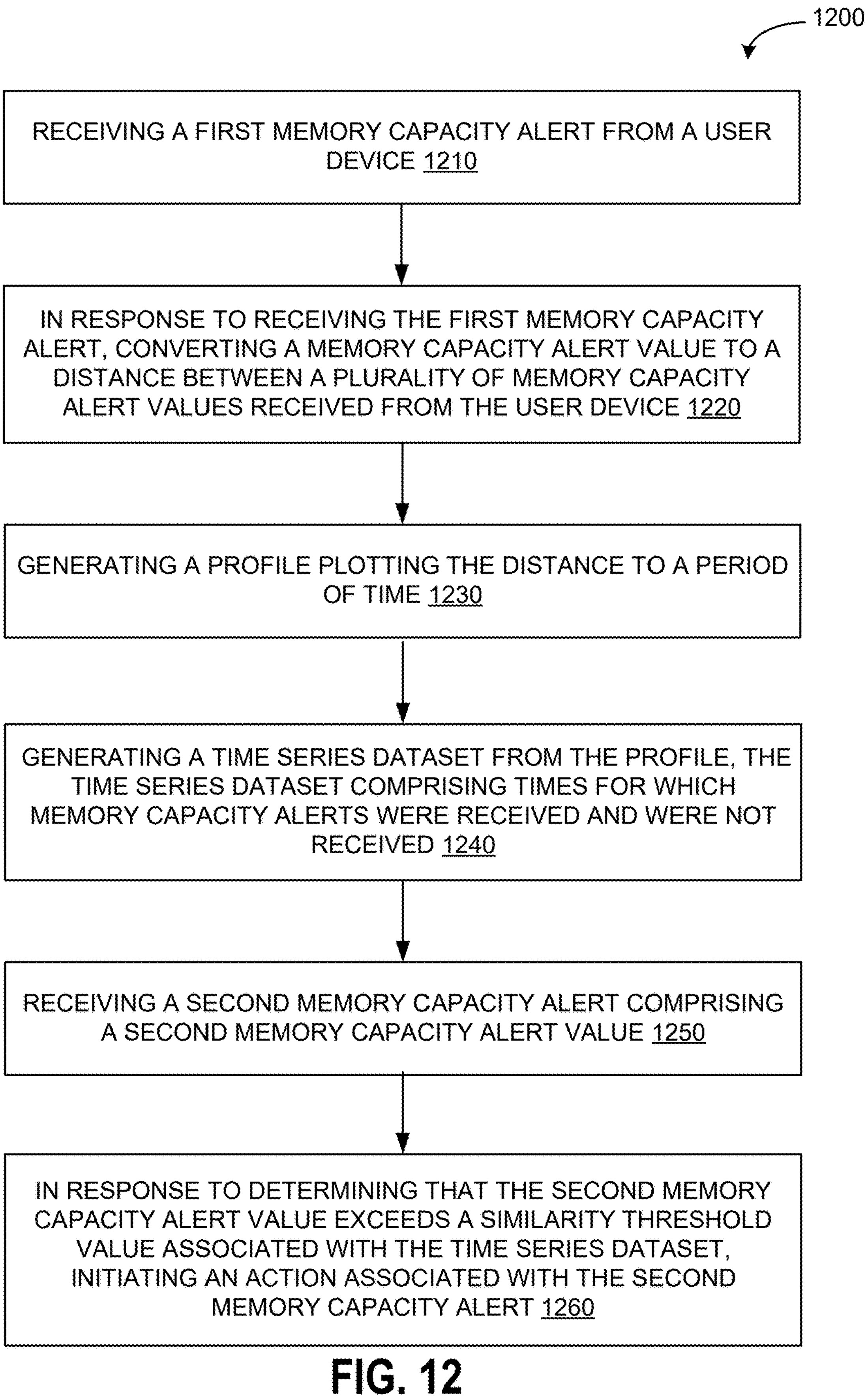
FIG. 12 is a process that may be used to implement examples of the disclosed technology.

FIG. 12 is a process 1200 that may be used to implement examples of the disclosed technology. In this example, the process 1210-1260 may be performed by a monitoring device in communication with a user device.

At operation 1210, the process may receive a first memory capacity alert from a user device. The user device may comprise a memory and the first memory capacity alert may be generated locally by the user device.

At operation 1220, the process may convert a memory capacity alert value to a distance between a plurality of memory capacity alert values received from the user device. The memory capacity alert value may be included in the memory capacity alert. The conversion may be initiated in response to receiving the first memory capacity alert.

The distance conversion may be based on a distance matrix. The distance matrix can include correlations between the memory capacity alert values that the monitoring device can use to convert the values to the distances. For example, a distance of 0 indicates identical memory capacity alert values, a distance of 1 indicates moderate similarity (e.g., 50% memory capacity alert value to 75% memory capacity alert value), and a distance of 2 indicates a higher threshold difference (e.g., 50% memory capacity alert value to 90% memory capacity alert value).

At operation 1230, the process may generate a profile plotting the distance to a period of time. For example, the monitoring device may create a profile that is summarizing the data from the first memory capacity alert and the distance generated using the distance matrix. If no memory capacity alert is received for a given day (or other period of time), the monitoring device may add a placeholder value (e.g., NaN) to help maintain the timeline and distribution of the alerts.

At operation 1240, the process may generate a time series dataset from the profile. The time series dataset may comprise times for which memory capacity alerts were received and were not received. In other words, profiles/days without alerts may be represented with placeholders.

At operation 1250, the process may receive a second memory capacity alert comprising a second memory capacity alert value. For example, a monitoring device may receive the second memory capacity alert associated with a user device. The second memory capacity alert may also be generated locally by the user device.

The process may convert the second memory capacity alert to a second profile using the memory capacity alert value. The process may also determine a distance between the second memory capacity alert value and other distances received in other alerts. In some examples, the process may compare the first profile to the second profile, and the anomaly identified in the second profile may be based on the comparison between the first profile and the second profile.

At operation 1260, the process may initiate an action associated with the second memory capacity alert. The action may be initiated in response to determining that the second memory capacity alert value exceeds a similarity threshold value associated with the time series dataset. Various actions may be initiated, like deleting/cleaning up the memory device, adding more memory capacity, or executing a local command to reclaim memory capacity (e.g., DEFRAG, ZIP).

FIG. 13 illustrates a computing component that may be used to detect memory capacity anomalies in sparse data environments, in accordance with various examples of the disclosed technology. Referring now to FIG. 13, computing component 1300 may be, for example, a server computer, a controller, or any other similar computing component capable of processing data. In the example implementation of FIG. 13, the computing component 1300 includes hardware processor 1302 and machine-readable storage medium 1304.

Hardware processor 1302 may be one or more central processing units (CPUs), semiconductor-based microprocessors, and/or other hardware devices suitable for retrieval and execution of instructions stored in machine-readable storage medium 1304. Hardware processor 1302 may fetch, decode, and execute instructions, such as instructions 1310-1360, to control processes or operations for detecting memory capacity anomalies in sparse data environments. As an alternative or in addition to retrieving and executing instructions, hardware processor 1302 may include one or more electronic circuits that include electronic components for performing the functionality of one or more instructions, such as a FPGA, ASIC, or other electronic circuits.

A machine-readable storage medium, such as machine-readable storage medium 1304, may be any electronic, magnetic, optical, or other physical storage device that contains or stores executable instructions. Thus, machine-readable storage medium 1304 may be, for example, RAM, NVRAM, EEPROM, a storage device, an optical disc, and the like. In some examples, machine-readable storage medium 1304 may be a non-transitory storage medium, where the term "non-transitory" does not encompass transitory propagating signals. As described in detail below, machine-readable storage medium 1304 may be encoded with executable instructions, for example, instructions 1310-1360.

Hardware processor 1302 may execute instruction 1310 to receive, from a user device, a first memory capacity alert. The user device may comprise a memory and the first memory capacity alert is generated locally by the user device.

Hardware processor 1302 may execute instruction 1320 to convert a memory capacity alert value to a distance between a plurality of memory capacity alert values received from the user device. The memory capacity alert value may be included in the memory capacity alert. The conversion may be initiated in response to receiving the first memory capacity alert.

The distance conversion may be based on a distance matrix. The distance matrix can include correlations between the memory capacity alert values that the monitoring device can use to convert the values to the distances. For example, a distance of 0 indicates identical memory capacity alert values, a distance of 1 indicates moderate similarity (e.g., 50% memory capacity alert value to 75% memory capacity alert value), and a distance of 2 indicates a higher threshold difference (e.g., 50% memory capacity alert value to 90% memory capacity alert value).

Hardware processor 1302 may execute instruction 1330 to generate a profile plotting the distance to a period of time. For example, the monitoring device may create a profile that is summarizing the data from the first memory capacity alert and the distance generated using the distance matrix. If no memory capacity alert is received for a given day (or other period of time), the monitoring device may add a placeholder value (e.g., NaN) to help maintain the timeline and distribution of the alerts.

Hardware processor 1302 may execute instruction 1340 to generate a time series dataset from the profile. The time series dataset may comprise times for which memory capacity alerts were received and were not received. In other words, profiles/days without alerts may be represented with placeholders.

Hardware processor 1302 may execute instruction 1350 to receive a second memory capacity alert comprising a second memory capacity alert value. For example, a monitoring device may receive the second memory capacity alert associated with a user device. The second memory capacity alert may also be generated locally by the user device.

The process may convert the second memory capacity alert to a second profile using the memory capacity alert value. The process may also determine a distance between the second memory capacity alert value and other distances received in other alerts. In some examples, the process may compare the first profile to the second profile, and the anomaly identified in the second profile may be based on the comparison between the first profile and the second profile.

Hardware processor 1302 may execute instruction 1360 to initiate an action associated with the second memory capacity alert. For example, the action may be initiated in response to determining that the second memory capacity alert value exceeds a similarity threshold value associated with the time series dataset. Various actions may be initiated, like deleting/cleaning up the memory device, adding more memory capacity, or executing a local command to reclaim memory capacity (e.g., DEFRAG, ZIP).

Figure 14:
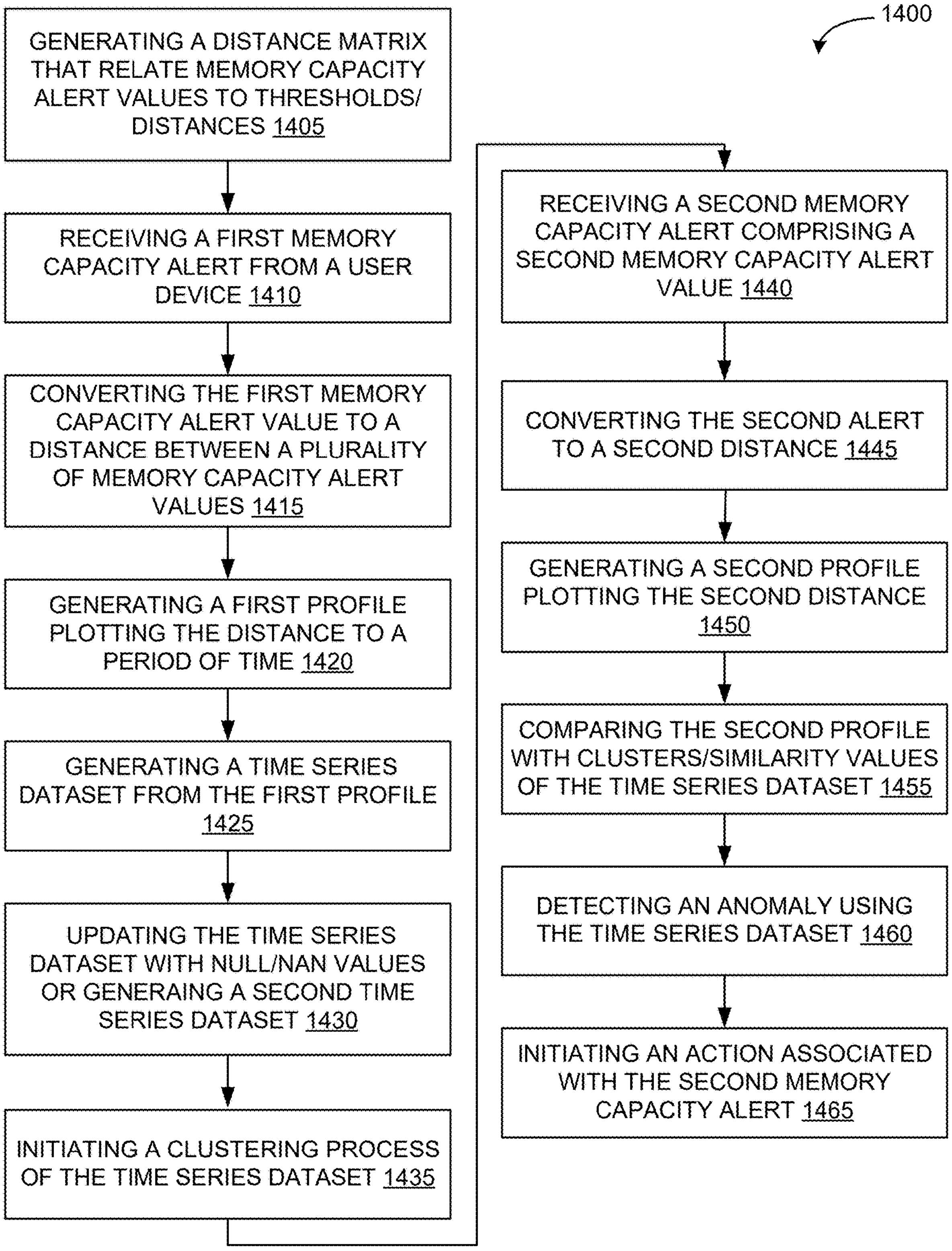
FIG. 14 is a process that may be used to implement examples of the disclosed technology.

FIG. 14 is a process that may be used to implement examples of the disclosed technology. In this example, the process 1405-1460 may be performed by a monitoring device in communication with a user device.

At operation 1405, the process may generate a distance matrix. The distance matrix may convert the memory capacity alert values to a different scale than a linear scale by defining the distances between these memory capacity alert values as being the same distance, irrespective of the non-linear nature of the actual values (e.g., using memory capacity alert values corresponding to 50%, 75%, 90% or distance matrix values corresponding to 0, 1, and 3, respectively). The monitoring device can convert the memory capacity alert values using the distance matrix by comparing two memory capacity values in two memory capacity alerts and converting the difference between the memory capacity values to a first value/distance.

At operation 1410, the process may receive a first memory capacity alert from a user device. The user device may comprise a memory and the first memory capacity alert may be generated locally by the user device.

At operation 1415, the process may convert the first memory capacity alert value to a distance between a plurality of memory capacity alert values received from the user device (e.g., using the distance matrix). The memory capacity alert value may be included in the memory capacity alert. The conversion may be initiated in response to receiving the first memory capacity alert.

At operation 1420, the process may generate a first profile plotting the distance to a period of time. For example, the monitoring device may create a profile that is summarizing the data from the first memory capacity alert and the distance generated using the distance matrix. If no memory capacity alert is received for a given day (or other period of time), the monitoring device may add a placeholder value (e.g., NaN) in the first profile to help maintain the timeline and distribution of the alerts.

At operation 1425, the process may generate a time series dataset from the first profile, which may include the memory capacity alert values and their relative similarities. The time series dataset may comprise the distance values along a timeline that identifies when the memory capacity alert value was received.

At operation 1430, the process may update the time series dataset with a placeholder value (e.g., NaN) if no memory capacity alert is received for a given day (or other period of time). The addition of the placeholder value may help maintain the timeline and distribution of the alerts. This may be in addition to or alternative from the placeholder value(s) in the first profile.

In some examples, the process can create a second time series dataset with the placeholder value(s) rather than updating the initial time series dataset. The second time series dataset may maintain a complete timeline, irrespective of whether alerts are received from the user device or not.

At operation 1435, the process may initiate a clustering process or identifying statistical thresholds of the time series dataset to identify similarities in the time series dataset over time and multiple alerts. For example, in clustering (e.g., k-means, hierarchical clustering), similar daily usage alert profiles can be grouped to create a cluster of periods of time with similar profiles. The clusters can be further identified across a larger timeline and distances between new memory capacity alerts and the existing clusters may be determined for consistency and recurring patterns in the operations of the user device. When statistical thresholds are used, the monitoring device may determine when memory capacity alert values exceed statistical thresholds, so that the monitoring device can differentiate normal patterns from anomalies.

Various similarities in the time series dataset may be defined. For example, one type of cluster may include profiles/days that correspond to "low alerts," where the alerts from the user device show low relative fluctuation in the capacity usage of the user device. The memory capacity may be operated fairly consistently across the monitored period of time with respect to the values identified for the memory capacity alerts in the distance matrix. Another cluster may include profiles/days that correspond to "mixed alerts," where the alerts from the user device show that the capacity usage of the user device is operating with greater fluctuation between the memory capacity alerts. Yet another cluster may include profiles/days that correspond to "high alerts," where the alerts from the user device show that large fluctuations in the memory capacity of the user device.

Alternatively, the process can compute statistical measures (e.g., mean and standard deviation) across the historical dataset to set ranges for each grouping of alerts (or other summary statistic). In each of these examples, the number of alerts that are received may be grouped in a cluster, which can identify how many times the user device reached this particular memory capacity threshold.

At operation 1440, the process may receive a second memory capacity alert comprising a second memory capacity alert value. The second memory capacity alert may also be generated locally by the user device.

At operation 1445, the process may convert the second memory capacity alert value in the second memory capacity alert to a second distance. For example, the distance may correspond to the distance identified in the distance matrix that converts two memory capacity alert values to a similarity value. The second distance may correspond to the second memory capacity alert value and other distances received in other alerts (e.g., in adjacent periods of time).

At operation 1450, the process may generate a second profile plotting the second distance to the time series dataset. For example, the monitoring device may access the time series dataset that includes the first profile and add the second profile. Both profiles may be generated with distances based on the same distance matrix. If no memory capacity alert is received for a given day (or other period of time) in either profile, the monitoring device may add a placeholder value.

At operation 1455, the process may compare the second profile with clusters or similarity values of the time series dataset. The comparison may help quantify the similarity between different memory capacity alert values. Any distinctions between the distances/profiles can identify the fluctuation between the values in the memory capacity alerts that are received by the monitoring device from the user device about its local memory.

At operation 1460, the process may detect an anomaly using the time series dataset. For example, when deviations are detected between a new/second memory capacity alert/profile and the existing clusters/patterns, the process may identify the anomaly. In some examples, the anomaly is based on the clusters with data values above a determined threshold value. The distance that exceeds the anomaly threshold may be determined to be anomalous.

In some examples, if any time periods deviate from the nearest cluster or exceed statistical limits, the process can flag the time periods as anomalous. Days with multiple high-threshold alerts (e.g., several 90% alerts) may be prioritized as potential capacity issues. In some examples, the anomaly can be inferred as an anomaly in the operations of the user device, absent having access to the full operational history of the user device's memory.

At operation 1465, the process may initiate an action associated with the second memory capacity alert. The action may be initiated in response to determining that the second memory capacity alert value exceeds a similarity threshold value associated with the time series dataset. Various actions may be initiated, like deleting/cleaning up the memory device, adding more memory capacity, or executing a local command to reclaim memory capacity (e.g., DEFRAG, ZIP).

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 15:
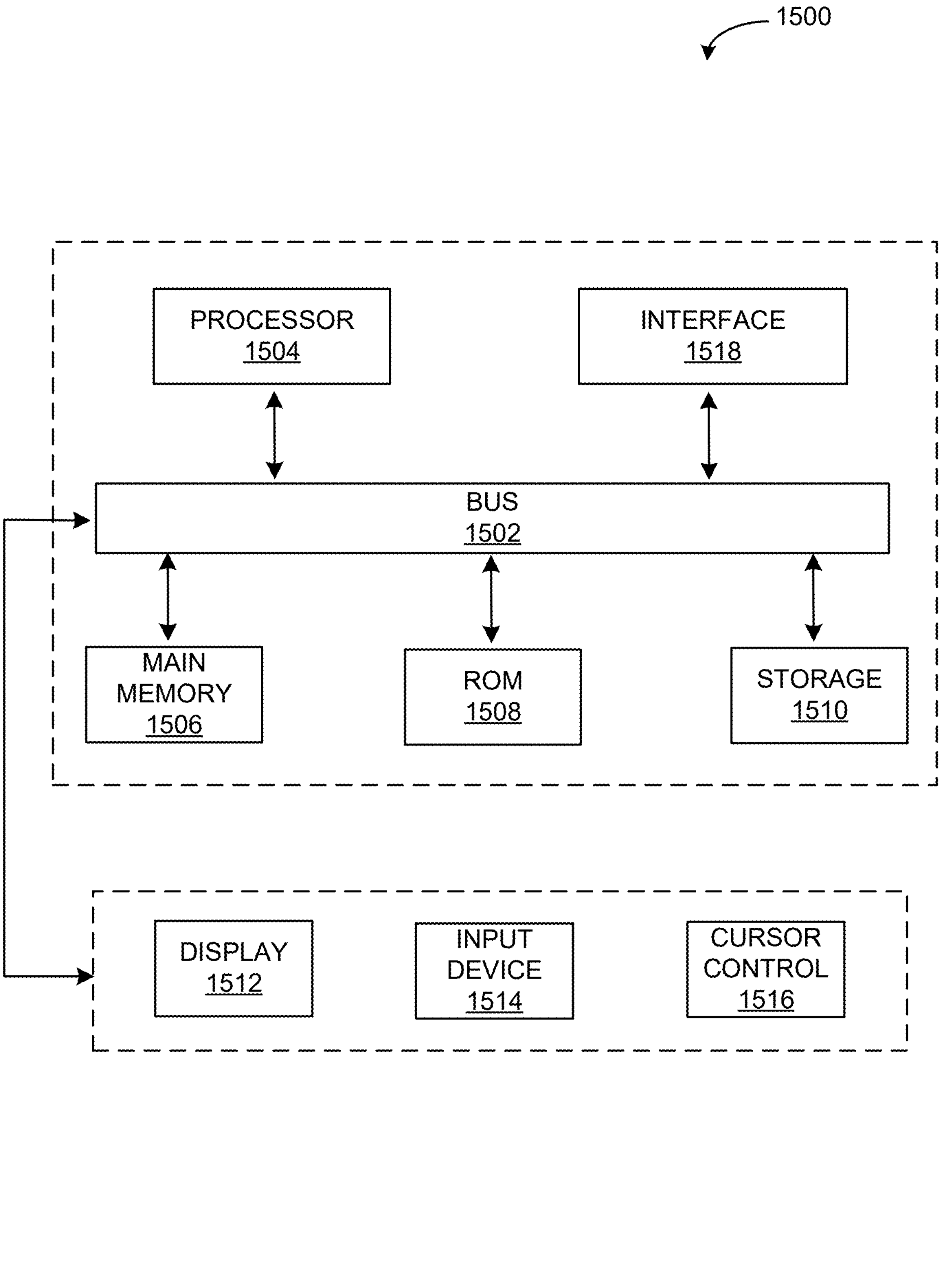
FIG. 15 depicts a block diagram of an example computer system in which various examples of the disclosed technology described herein may be implemented.

FIG. 15 depicts a block diagram of an example computer system 1500 in which various examples of the disclosed technology described herein may be implemented. Computer system 1500 includes bus 1502 or other communication mechanism for communicating information, one or more hardware processors 1504 coupled with bus 1502 for processing information. Hardware processor(s) 1504 may be, for example, one or more general purpose microprocessors.

Computer system 1500 also includes main memory 1506, such as a RAM, cache and/or other dynamic storage devices, coupled to bus 1502 for storing information and instructions to be executed by processor 1504. Main memory 1506 also may be used for storing temporary variables or other intermediate information during execution of instructions to be executed by processor 1504. Such instructions, when stored in storage media accessible to processor 1504, render computer system 1500 into a special-purpose machine that is customized to perform the operations specified in the instructions.

Computer system 1500 further includes read only memory (ROM) 1508 or other static storage device coupled to bus 1502 for storing static information and instructions for processor 1504. Storage device 1510, such as a magnetic disk, optical disk, or USB thumb drive (Flash drive), etc., is provided and coupled to bus 1502 for storing information and instructions.

Computer system 1500 may be coupled via bus 1502 to display 1512, such as a liquid crystal display (LCD) (or touch screen), for displaying information to a computer user.

In some examples, display 1512, input device 1514, and cursor control 1516 may be utilized to send and receive user feedback that is used in the ranking process and help indicate the document's relevance.

Input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. In some examples, the same direction information and command selections as cursor control may be implemented via receiving touches on a touch screen without a cursor.

Computer system 1500 may include a user interface module to implement a GUI to be presented on display 1512. The user interface module may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 1500 may implement the techniques described herein using customized hard-wired logic, one or more ASICs or FPGAs, firmware and/or program logic which in combination with the computer system causes or programs computer system 1500 to be a special-purpose machine. According to one example of the disclosed technology, the techniques herein are performed by computer system 1500 in response to processor(s) 1504 executing one or more sequences of one or more instructions contained in main memory 1506. Such instructions may be read into main memory 1506 from another storage medium, such as storage device 1510. Execution of the sequences of instructions contained in main memory 1506 causes processor(s) 1504 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1510. Volatile media includes dynamic memory, such as main memory 1506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1502. Transmission media can also take the form of acoustic or light waves, such as those generated during radio-wave and infrared data communications.

Computer system 1500 also includes interface 1518 coupled to bus 1502. Interface 1518 provides a two-way data communication coupling to one or more network links that are connected to one or more local networks. For example, interface 1518 may be an integrated services digital network (ISDN) card, cable modem, satellite modem, or a modem to provide a data communication connection to a corresponding type of telephone line. As another example, interface 1518 may be a local area network (LAN) card to provide a data communication connection to a compatible LAN (or WAN component to communicate with a WAN). Wireless links may also be implemented. In any such implementation, interface 1518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 1518, which carry the digital data to and from computer system 1500, are example forms of transmission media.

Computer system 1500 can send messages and receive data, including program code, through the network(s), network link and interface 1518. In the Internet example, a server might transmit a requested code for an application program through the Internet, the ISP, the local network and interface 1518.

The received code may be executed by processor 1504 as it is received, and/or stored in storage device 1510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:

receiving, at a monitoring device associated with a user device, a memory capacity alert, wherein the user device comprises a memory, and wherein the memory capacity alert is generated locally by the user device;

in response to receiving the memory capacity alert, converting, by the monitoring device, a memory capacity alert value to a distance between a plurality of memory capacity alert values received from the user device, wherein the memory capacity alert value is included in the memory capacity alert;

generating, by the monitoring device, a profile plotting the distance to a period of time;

generating, by the monitoring device, a time series dataset from the profile, the time series dataset maintaining the distance to the period of time with times for which memory capacity alerts were not received;

using the time series dataset, detecting, by the monitoring device, an anomaly associated with the user device; and in response to detecting the anomaly, initiating, by the monitoring device, an action associated with the profile.

2. The method of claim 1, wherein the memory capacity alert is a first memory capacity alert, the memory capacity alert value is a first memory capacity alert value, and wherein the method further comprises:

receiving, by the monitoring device, a second memory capacity alert comprising a second memory capacity alert value;

converting, by the monitoring device, the second memory capacity alert value to a second distance; and when the second distance exceeds a similarity value of an existing cluster, determining, by the monitoring device, that the second memory capacity alert value is the anomaly.

3. The method of claim 2, further comprising:

generating a second profile using the second memory capacity alert value; and adding the second profile to the time series dataset.

4. The method of claim 2, wherein the profile is a first profile, and the method further comprises:

generating a second profile using the second memory capacity alert value; and comparing the first profile to the second profile, wherein the anomaly is based on the comparison between the first profile and the second profile.

5. The method of claim 1, wherein detecting the anomaly comprises:

executing a clustering process to identify a cluster of similar daily usage alert profiles in the time series dataset; and identifying a second profile that deviates from the cluster.

6. The method of claim 1, further comprising:

updating, by the monitoring device, the time series dataset with null or Not a Number (NaN) values for times in the period of time for which memory capacity alerts were not generated to generate a second time series dataset; and replacing the time series dataset with the second time series dataset.

7. The method of claim 1, further comprising:

generating, by the monitoring device, a distance matrix that relates the memory capacity alert value to an alert threshold value; and in response to determining that the alert threshold value is included in the distance matrix, converting the memory capacity alert value to a distance in the distance matrix.

8. The method of claim 1, further comprising:

executing a clustering process on the time series dataset, wherein the clustering process executes a k-means clustering algorithm in order to determine a similar grouping of profiles.

9. The method of claim 1, further comprising:

executing a clustering process on the time series dataset, wherein the clustering process executes a hierarchical clustering algorithm in order to group the memory capacity alerts into a tree of similar groupings.

10. The method of claim 1, further comprising:

generating a second memory capacity alert, wherein the second memory capacity alert comprises a suggestion to delete or clean up the memory at the user device, to add memory capacity at the user device, or comprises a local command to reclaim memory capacity at the user device; and transmitting the second memory capacity alert.

11. The method of claim 1, wherein the action comprises an automated adjustment of a parameter of the memory.

12. A monitoring device comprising:

a memory storing instructions; and a processor communicatively coupled to the memory and configured to execute the instructions to:

receive, from a user device, a memory capacity alert, the user device comprising a memory, and the memory capacity alert is generated locally by the user device;

in response to receiving the memory capacity alert, convert a memory capacity alert value to a distance between a plurality of memory capacity alert values received from the user device, wherein the memory capacity alert value is included in the memory capacity alert;

generate a time series dataset from the distance, the time series dataset maintaining the distance between the plurality of memory capacity alert values and times for which memory capacity alerts were not received from the user device;

initiate a clustering process using the time series dataset;

determine an anomaly based on the clustering process; and in response to detecting the anomaly, initiate an action associated with the user device that identifies the anomaly.

13. The monitoring device of claim 12, wherein the anomaly is determined by:

receiving, from the user device a second memory capacity alert comprising a second memory capacity alert value;

determining a similarity value between the second memory capacity alert value and an existing cluster; and in response to the similarity value exceeding a similarity threshold value, identifying a data point corresponding to the second memory capacity alert as anomalous.

14. The monitoring device of claim 12, wherein the memory capacity alert is a first memory capacity alert, the memory capacity alert value is a first memory capacity alert value, and the processor is further configured to:

receive a second memory capacity alert comprising a second memory capacity alert value;

convert the second memory capacity alert value to a second distance; and when the second distance exceeds a similarity value to an existing cluster, determine the second memory capacity alert value is the anomaly.

15. The monitoring device of claim 12, wherein the clustering process identifies a period of time that deviates from a nearest cluster in the time series dataset.

16. The monitoring device of claim 12, wherein the processor is further configured to:

update the time series dataset with null or Not a Number (NaN) values for times in a period of time for which memory capacity alerts were not generated to generate a second time series dataset; and replace the time series dataset with the second time series dataset to detect the anomaly.

17. The monitoring device of claim 12, wherein the processor is further configured to:

generate a distance matrix that relate the memory capacity alert values to memory capacity thresholds; and convert the memory capacity alert values to distances in the distance matrix.

18. A non-transitory computer-readable storage medium storing a plurality of instructions executable by a processor, the plurality of instructions when executed by the processor cause the processor to:

receive, from a user device, a first memory capacity alert, wherein the user device comprises a memory, and wherein the first memory capacity alert is generated locally by the user device;

in response to receiving the first memory capacity alert, convert a memory capacity alert value to a distance between a plurality of memory capacity alert values received from the user device, wherein the memory capacity alert value is included in the memory capacity alert;

generate a profile plotting the distance to a period of time;

generate a time series dataset from the profile, the time series dataset comprising times for which memory capacity alerts were received and were not received;

receive a second memory capacity alert comprising a second memory capacity alert value; and in response to determining that the second memory capacity alert value exceeds a similarity threshold value associated with the time series dataset, initiate an action associated with the second memory capacity alert.

19. The non-transitory computer-readable storage medium of claim 18, wherein one or more of the plurality of instructions when executed by the processor cause the processor to:

generate a second profile of the second memory capacity alert; and compare the second profile to the time series dataset to determine an anomaly.

20. The non-transitory computer-readable storage medium of claim 18, wherein one or more of the plurality of instructions when executed by the processor cause the processor to:

update the time series dataset with null or Not a Number (NaN) values for times in the period of time for which memory capacity alerts were not generated to generate a second time series dataset.

* * * * *